United States Patent
James et al.

(10) Patent No.: US 11,321,502 B2
(45) Date of Patent: May 3, 2022

(54) DRIVELINE DESIGNER

(71) Applicant: ROMAX TECHNOLOGY LIMITED, Cobham (GB)

(72) Inventors: Barry James, Nottingham (GB); George Grant, Nottingham (GB); James Day, Nottingham (GB); Sharad Jain, Nottingham (GB); Annabel Shahaj, Nottingham (GB); Kathryn Taylor, Nottingham (GB)

(73) Assignee: ROMAX TECHNOLOGY LIMITED, Cobham (GB)

( * ) Notice: Subject to any disclaimer, the term of this patent is extended or adjusted under 35 U.S.C. 154(b) by 140 days.

(21) Appl. No.: 16/646,020

(22) PCT Filed: Sep. 11, 2018

(86) PCT No.: PCT/IB2018/056937
§ 371 (c)(1),
(2) Date: Mar. 19, 2020

(87) PCT Pub. No.: WO2019/049108
PCT Pub. Date: Mar. 14, 2019

(65) Prior Publication Data
US 2020/0394345 A1    Dec. 17, 2020

(30) Foreign Application Priority Data

Sep. 11, 2017 (GB) .................................. 1714586
Sep. 11, 2017 (GB) .................................. 1714593

(51) Int. Cl.
*G06F 30/15* (2020.01)
*G06F 30/17* (2020.01)
(Continued)

(52) U.S. Cl.
CPC .............. *G06F 30/15* (2020.01); *G06F 30/17* (2020.01); *G06F 30/23* (2020.01); *G06F 2111/10* (2020.01); *G06F 2119/08* (2020.01)

(58) Field of Classification Search
CPC .......... G06F 30/17; G06F 30/15; G06F 30/23; G06F 2119/08; G06F 2111/10
(Continued)

(56) References Cited

U.S. PATENT DOCUMENTS

| | | |
|---|---|---|
| 2003/0149498 A1 | 8/2003 | Rebello et al. |
| 2011/0078100 A1 | 3/2011 | Goel |
| 2013/0085722 A1 | 4/2013 | James |

FOREIGN PATENT DOCUMENTS

| | | |
|---|---|---|
| CN | 107729597 A | 2/2018 |
| EP | 2587423 A2 | 5/2013 |

(Continued)

OTHER PUBLICATIONS

Durand de Gevigney, J et al., "Thermal Modeling of a Back-to-Back Gearbox Test Machine: Application to the FZG Test Rig", 2912, Institutional of Mechanical Engineers. (Year: 2012).*

(Continued)

*Primary Examiner* — Cedric Johnson
(74) *Attorney, Agent, or Firm* — Maschoff Brennan

(57) ABSTRACT

A computer-implemented method for modelling a driveline, the driveline comprising a plurality of components. The method comprising the steps of: a) receiving a parametric description of the driveline; b) creating a thermal model of the driveline from the parametric description; c) calculating a temperature distribution for one or more components of the driveline using the thermal model; d) determining a deflection of one or more components of the driveline caused by the thermal distribution, based on the parametric description and the temperature distribution; and e) calcu- (Continued)

lating a performance metric of the driveline based on the determined deflection of the one or more components.

19 Claims, 11 Drawing Sheets

(51) Int. Cl.
*G06F 30/23* (2020.01)
*G06F 111/10* (2020.01)
*G06F 119/08* (2020.01)

(58) Field of Classification Search
USPC .............................................................. 703/2
See application file for complete search history.

(56) References Cited

FOREIGN PATENT DOCUMENTS

| GB | 2506532 | A | * | 4/2014 | ............. G06F 30/17 |
|---|---|---|---|---|---|
| GB | 2506532 | A1 | | 4/2014 | |
| GB | 2510824 | B | | 9/2015 | |
| JP | 2008033817 | A2 | | 2/2008 | |
| JP | 2011508346 | T2 | | 3/2011 | |
| JP | 2013093018 | A | * | 5/2013 | ......... G05B 23/0232 |
| JP | 2013093018 | A2 | | 5/2013 | |
| JP | 2015533244 | T2 | | 11/2015 | |
| RU | 2608202 | C2 | | 1/2017 | |
| WO | 09011762 | A1 | | 1/2009 | |
| WO | 09133161 | A2 | | 11/2009 | |
| WO | WO2017/085694 | A2 | | 5/2017 | |

OTHER PUBLICATIONS

Kolivand M. et al. "Prediction of mechanical gear mesh efficiency of hypoid gear pairs" Mechanism and Machine Theory vol. 45 No. 11, Nov. 1, 2010, pp. 1568-1582.

"Thermal modelling of an FZG test gearbox" by Carlos Prakash Del Valle of KTH Industrial Engineering and Management Machine Design.

Gee Soo Lee, "Underhood Thermal Simulations for Lay-out Design in Engine Room" Auto Journal 35(6), Jun. 2013, pp. 42-46.

* cited by examiner

Parametric description

Parametric description

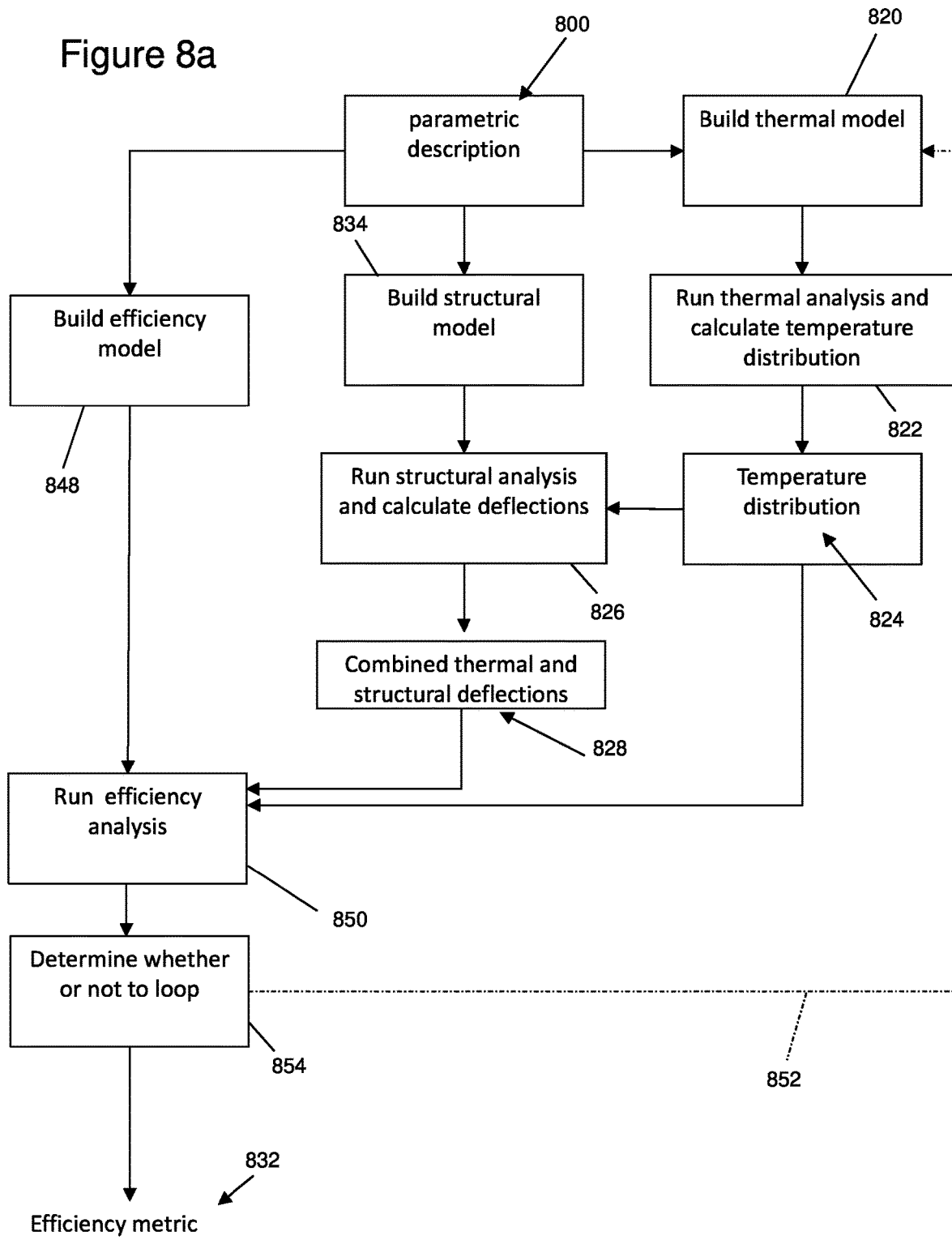

DRIVELINE DESIGNER

TECHNICAL FIELD

The present invention is related to the design and modelling of drivelines and the assemblies that make up drivelines, using computer-aided engineering (CAE), and in particular to the effects of thermal performance on the design.

Drivelines comprise a system made up of a plurality of components that may include internal combustion engines, gearboxes, transmissions, driveshafts, constant velocity joints, universal joints, axles, differentials, electric machines, generators, motors, flywheels, batteries, fuel tanks, super-capacitors, fuel cells, inverters, converters, clutches, gears, pumps, shafts, housings, pistons, blades, bearings, rotors, stators and the like. Applications of drivelines can include vehicles, turbines, marine vessels, aircraft, helicopters, and wind turbines.

BACKGROUND

A mechanical driveline focuses on mechanical engineering aspects, as the mechanical sub-assemblies dominate and the electrical sub-assemblies are peripheral. The term electro-mechanical driveline is used to account for the fact that recent developments across many industries have seen an increasing use of electric drives, where the electrical sub-assemblies are increasingly important. Example industries include the wind industry, electric and hybrid passenger cars, hybrid marine drives, more electric aircraft, and trains with regenerative braking. The term "electric machine" is often used to refer to a motor/generator, since they are often the same component which can be operated in either mode. When referring to an electric machine, this can mean any of the following: brushed DC machines, induction machines including doubly fed induction generators, surface mounted permanent magnet machines, internally mounted permanent magnet machines, axial flux permanent magnet machines, switched reluctance machines, synchronous reluctance machines, wound field machines, doubly salient or flux switching permanent magnet machines, and permanent magnet assisted synchronous machines.

In many of these examples the electrical and mechanical systems are becoming increasingly integrated in order to achieve satisfactory power density, cost and efficiency.

Electric machines often require electronic components such as inverters, converters and the like which can be collectively known as power electronics. Thus, there can be three principal sub-systems that define an electro-mechanical driveline—gearbox, electric machine and power electronics. These three sub-systems operate by different physical principles, but when they are assembled together in an integrated electro-mechanical driveline, physical interactions between these three sub-systems start to occur. Moreover, as the performance of these sub-systems is extended further, different physical phenomena start to interact with one another. The term "driveline" covers a system that includes any or all of an electric machine, a gearbox, and power electronics.

The principal function of a driveline is to transmit mechanical rotational power. Electro-mechanical drivelines can also convert power from electrical to mechanical, or the other way round. This needs to be done as efficiently as possible, with minimal power loss. This requirement has become increasingly important in the battle against global warming and where hybrid and electric vehicles are designed with the specific intention of minimising energy/fuel consumption.

GB2506532A discloses an approach in which key engineering parameters of the driveline are defined in a single parametric model, including form, function, operating conditions, and properties. These are defined in a parametric description that allows rapid redefinition of the design, allowing rapid design-analyse-redesign iterations according to the results of a multiplicity of physical simulations.

BRIEF DESCRIPTION OF THE INVENTION

One or more examples described herein relate to the subject of thermal performance and how it interacts with other aspects of physical behaviour such as deflections, stress, fatigue, efficiency, noise, vibration, wear etc. of components in a driveline. The functionality of such examples can provide to the design engineer insight on thermal behaviour and how it affects the other aspects of driveline performance so that designs can be optimised and confirmed as fit for purpose with a productivity not previously possible. Time and money can be saved in the bringing of new products to market. Also, problems in existing products can be effectively resolved by using examples disclosed herein. Most importantly, there is the potential to further safeguard human life.

According to a first aspect of the present disclosure there is provided a computer-implemented method for modelling a driveline, the driveline comprising a plurality of components, the method comprising the steps of:

a) receiving a parametric description of the driveline;
b) creating a thermal model of the driveline from the parametric description;
c) calculating a temperature distribution for one or more components of the driveline using the thermal model;
d) determining a deflection of one or more components of the driveline caused by the thermal distribution, based on the parametric description and the temperature distribution; and
e) calculating a performance metric of the driveline based on the determined deflection of the one or more components.

Any method disclosed herein may comprise:
creating a structural model of the driveline from the parametric description; and
determining the deflection of one or more components of the driveline caused by the thermal distribution, based on the structural model and the temperature distribution.

Any method disclosed herein may comprise:
recalculating the temperature distribution for the one or more components of the driveline based on the thermal model and also the determined deflection; and repeating steps d) and e) for the recalculated temperature distribution.

Any method disclosed herein may comprise:
comparing the temperature distribution and/or deflections with one or more loop-end-conditions; and
if the one or more loop-end-conditions are not satisfied, then:
  recalculating the temperature distribution for the one or more components of the driveline based on the thermal model and also the determined deflection; and
  repeating steps d) and e) for the recalculated temperature distribution.

Any method disclosed herein may comprise:
updating the parametric description based on the performance metric of the driveline; and
repeating steps b) to e) for the updated parametric description.

Any method disclosed herein may comprise:
comparing the performance metric with one or more loop-end-conditions; and
if the one or more loop-end-conditions are not satisfied, then:
updating the parametric description based on the performance metric; and
repeating steps b) to e) for the updated parametric description Any method disclosed herein may comprise:
receiving an indication of a type of analysis to be performed for the driveline; and
calculating the performance metric of the driveline according to the type of analysis to be performed.

Any method disclosed herein may comprise:
building a mathematical model of the driveline from the parametric description, based on the type of analysis to be performed; and
calculating the performance metric of the driveline according to the type of analysis to be performed and the mathematical model.

Building the mathematical model of the driveline from the parametric description may comprise processing a subset of information that is provided by the parametric description.

The type of analysis to be performed may be efficiency analysis. The performance metric may be an efficiency metric.

Any method disclosed herein may comprise:
calculating the efficiency metric of the driveline based on: (i) the parametric description, (ii) the determined deflection of the one or more components, and (iii) the calculated temperature distribution.

Any method disclosed herein may comprise:
calculating a power loss profile of the driveline based on: (i) the parametric description, (ii) the determined deflection of the one or more components, and (iii) the calculated temperature distribution; and
comparing the performance power loss profile with one or more loop-end-conditions.

If the one or more loop-end-conditions are not satisfied, then:
the method may involve recreating the thermal model of the driveline based on the power loss profile; and
repeating the calculation of the power loss profile based on the recreated thermal model;

If the one or more loop-end-conditions are satisfied, then:
the method may involve calculating the efficiency metric of the driveline based on: (i) the parametric description, (ii) the determined deflection of the one or more components, and (iii) the calculated temperature distribution.

Any method disclosed herein may comprise:
building a structural meshed model based on the parametric description;
building a meshed-thermal-model based on the structural meshed model;
calculating a temperature distribution for one or more components of the driveline using: (i) the meshed-thermal-model; and (ii) one or more fluid temperatures associated with the driveline;
determining the deflection of one or more components of the driveline caused by the thermal distribution, based on: (i) the structural meshed model; and (ii) the temperature distribution; and
calculating the performance metric of the driveline based on the determined deflection of the one or more components.

The method may further comprise:
creating a lumped-parameter-thermal-model of the driveline from the parametric description;
calculating the fluid temperature associated with the driveline based on the lumped-parameter-thermal-model.

The method may further comprise:
receiving the fluid temperature associated with the driveline as an input from a sensor.

Calculating a performance metric may include:
applying a drive cycle to the driveline for a plurality of different environmental conditions.

Any method disclosed herein may comprise:
automatically determining which features of the parametric description to use for calculating the performance metric, based on a type of analysis to be performed.

Creating the thermal model of the driveline may comprise:
calculating power losses at one or more of the components of the driveline; and
converting the calculated power losses into one or more thermal inputs of the thermal model.

Any method disclosed herein may comprise:
calculating a value of operating misalignment based on the determined deflection; and
calculating power losses for the driveline based on the value of operating misalignment.

Any method disclosed herein may comprise:
calculating a value of operating misalignment based on the determined deflection; and
calculating one or more of the following based on value of operating misalignment: gear stress, gear fatigue, gear scuffing, gear transmission error, gear mesh power loss, gear mesh stiffness, planetary gear load-sharing, bearing non-linear stiffness, bearing fatigue, driveline efficiency, driveline mode shapes, dynamic forced response due to excitations such as gear transmission error, torque ripple, stator radial forces.

The method may further comprise:
using a predicted lubricant temperature within the driveline as an input to the calculation of gear scuffing.

Any method disclosed herein may comprise:
calculating the performance metric by performing dynamic analysis of the driveline, including calculating a matrix of masses and stiffnesses of components in the driveline.

The method may further comprise:
calculating load and angle-dependent stiffness of a constant velocity joint and including this in the driveline dynamic analysis.

The method may further comprise:
calculating load-dependent stiffness of rolling element bearings and including this in the driveline dynamic analysis.

The parametric description of the driveline may include manufacturing tolerances.

There may be provided a computer readable product for computer aided engineering design of a driveline, the product comprising code means for implementing the steps of any method disclosed herein.

There may be provided a computer system for computer-aided engineering design of a driveline, the system comprising means designed for implementing the steps of the any method disclosed herein.

There may be provided a driveline designed using any method disclosed herein.

According to a further aspect of the invention, there is provided a computer-implemented method for modelling a driveline, the driveline comprising a plurality of components including a gearbox, the method comprising the steps of:

a) receiving a parametric description of the driveline;

b) receiving an indication of a type of analysis to be performed for the driveline;

c) creating a thermal model of at least the gearbox of the driveline from the parametric description;

d) calculating a temperature distribution for at least the gearbox of the driveline using the thermal model; and e) calculating a performance metric of the driveline according to the type of analysis to be performed, the calculated temperature distribution, and the parametric description.

Any method disclosed herein may comprise:

creating a structural model of the driveline based on the parametric description; and calculating the performance metric of the driveline based on the structural model and the calculated temperature distribution.

Any method disclosed herein may comprise:

recreating the thermal model based on a loop-performance-metric associated with the driveline; and repeating steps d) and e) for the recalculated temperature distribution.

The method may further comprise:

comparing the loop-performance-metric with one or more loop-end-conditions; and if the one or more loop-end-conditions are not satisfied, then:

recreating the thermal model based on the loop-performance-metric associated with the driveline; and repeating steps d) and e) for the recreated the thermal model.

Any method disclosed herein may comprise:

recalculating the temperature distribution based on a loop-performance-metric associated with the driveline; and repeating step e) for the recalculated temperature distribution.

The loop-performance-metric may comprise the performance metric or an intermediate-performance-metric.

The method may further comprise:

comparing the loop-performance-metric with one or more loop-end-conditions; and if the one or more loop-end-conditions are not satisfied, then:

recalculating the temperature distribution based on the loop-performance-metric associated with the driveline; and repeating step e) for the recreated the thermal model.

The driveline may include an electric machine.

BRIEF DESCRIPTION OF DRAWINGS

The present invention will now be described, by way of example only, with reference to the accompanying drawings, in which:

FIG. 8a shows a schematic view of another computer-implemented method for modelling a driveline, which is similar to FIG. 7;

BEST MODE FOR CARRYING OUT THE INVENTION

A computer-implemented method can be used for modelling a driveline, and in particular to perform one or more different types of analysis on a parametric description that is representative of the design of a driveline. Further details of how a parametric description can be implemented will be discussed below.

A driveline design engineer can aim to satisfy performance targets that relate to one or more of the following aspects (as non-limiting examples), to the best of their abilities, within the design process: (i) driveline efficiency, for instance in terms of efficiency of energy conversion as represented by energy/fuel consumption, (ii) the avoidance of gear failure due to fatigue or scuffing, (iii) the avoidance of bearing failure due to fatigue, and (iv) the minimisation of gear whine and the maximisation of driveline efficiency. Different types of analysis can be used to determine different performance metrics for the driveline, which can then be compared with associated performance targets. An ability to meet a performance target can also be considered as avoiding a "failure mode" of the driveline.

Simulation tools can be used to apply such analysis. For example, application-specific CAE tools for mechanical driveline design such as RomaxDESIGNER, MASTA and KissSoft predict gear fatigue to ISO 6336 and AGMA 2001, and bearing fatigue to various standards related to and derived from ISO 281. Gear scuffing is predicted and gear mesh losses are predicted using ISO TR14179 and other methods. All these methods have been developed specifically for gears and bearings and so they do not exist in generalist CAE tools such as finite element analysis (FEA), model-based definition (MBD), or multi-domain simulation.

In traditional CAE tools, CAD provides form (geometry) and some aspects of properties (for example, material density but not Young's modulus), but it does not include operating conditions or function. Models in MBD and FEA tools can include certain aspects of form, function, properties and operating conditions, but only those that are pertinent to the specific failure mode that is being simulated.

Figure 1:
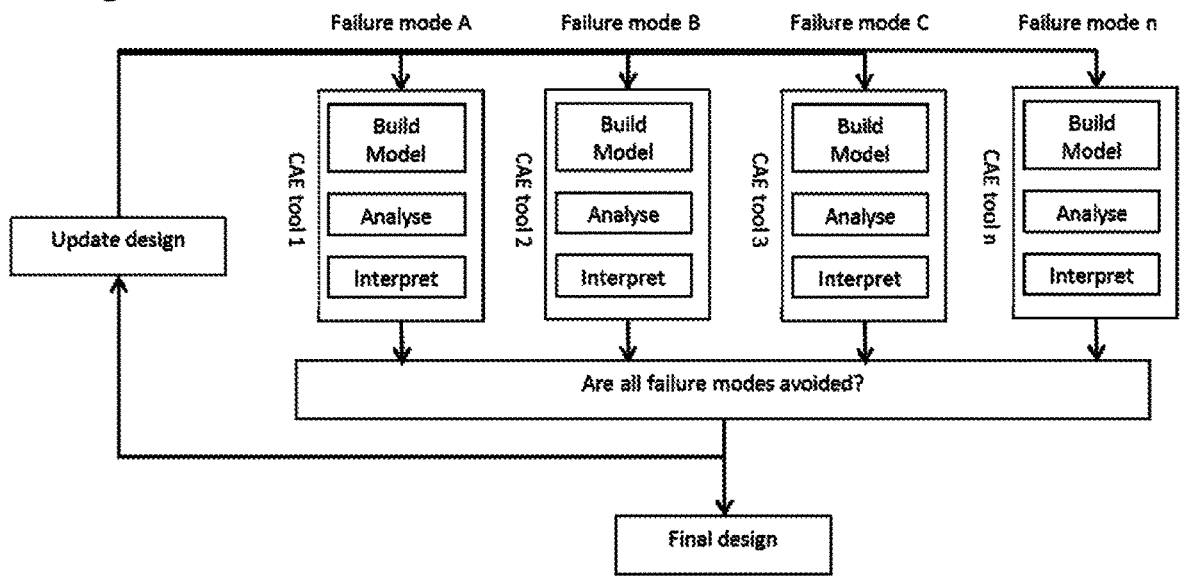
FIG. 1 shows how separate models can be used by separate CAE tools for separate failure mode analyses.

FIG. 1 shows how separate models can be used by separate CAE tools, such that each of the models can be used to determine a performance metric of the driveline, and hence whether or not a performance target is satisfied and a failure mode is avoided. This can involve comparing a performance metric with a performance target.

In various of the examples described below, a single parametric description of the driveline can be used, from which multiple models for multiple performance metrics and failure mode analyses can be derived.

Figure 2A:
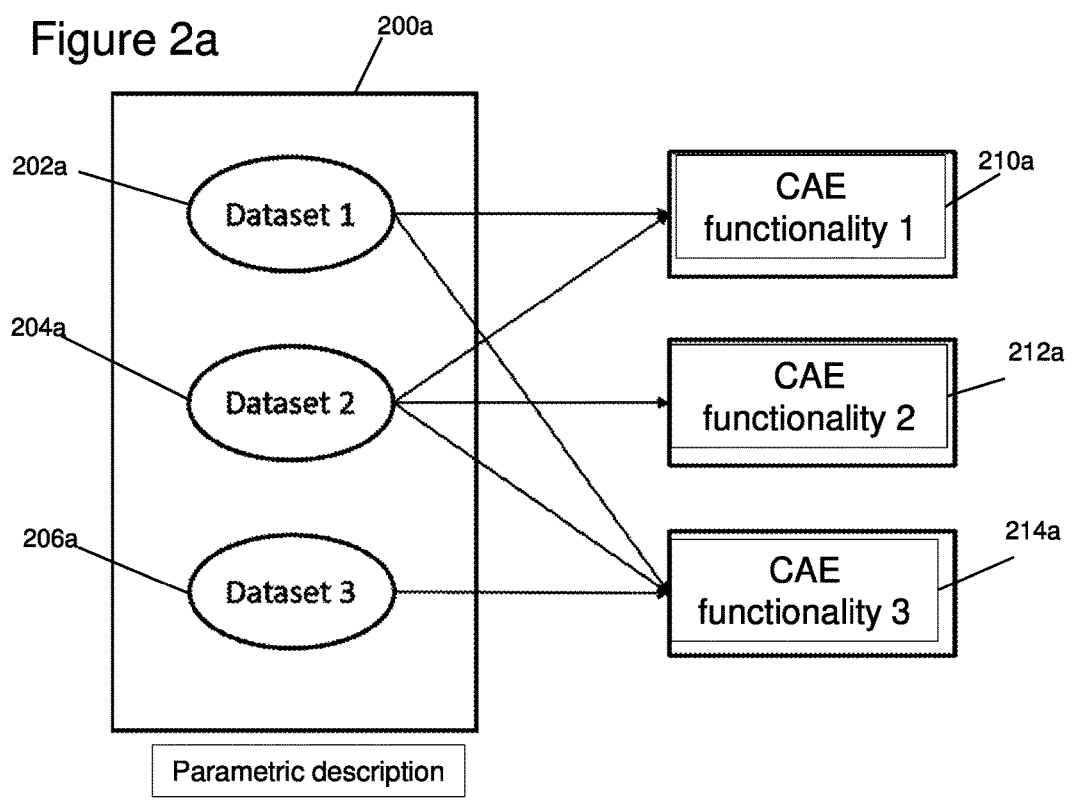
FIG. 2a illustrates schematically an example of a parametric description.

FIG. 2a illustrates schematically an example of a parametric description 200a. The parametric description 200a includes a plurality of datasets 202a, 204a, 206a, one or more of which can be used to perform a different CAE functionality 210a, 212a, 214a. Traditionally, each CAE functionality is provided by a separate CAE tool, each carrying out a different type of analysis. The parametric description 200 can comprise a collection of data (the datasets 202a, 204a, 206a) that defines the driveline and optionally also how the driveline will be operated.

Figure 2B:
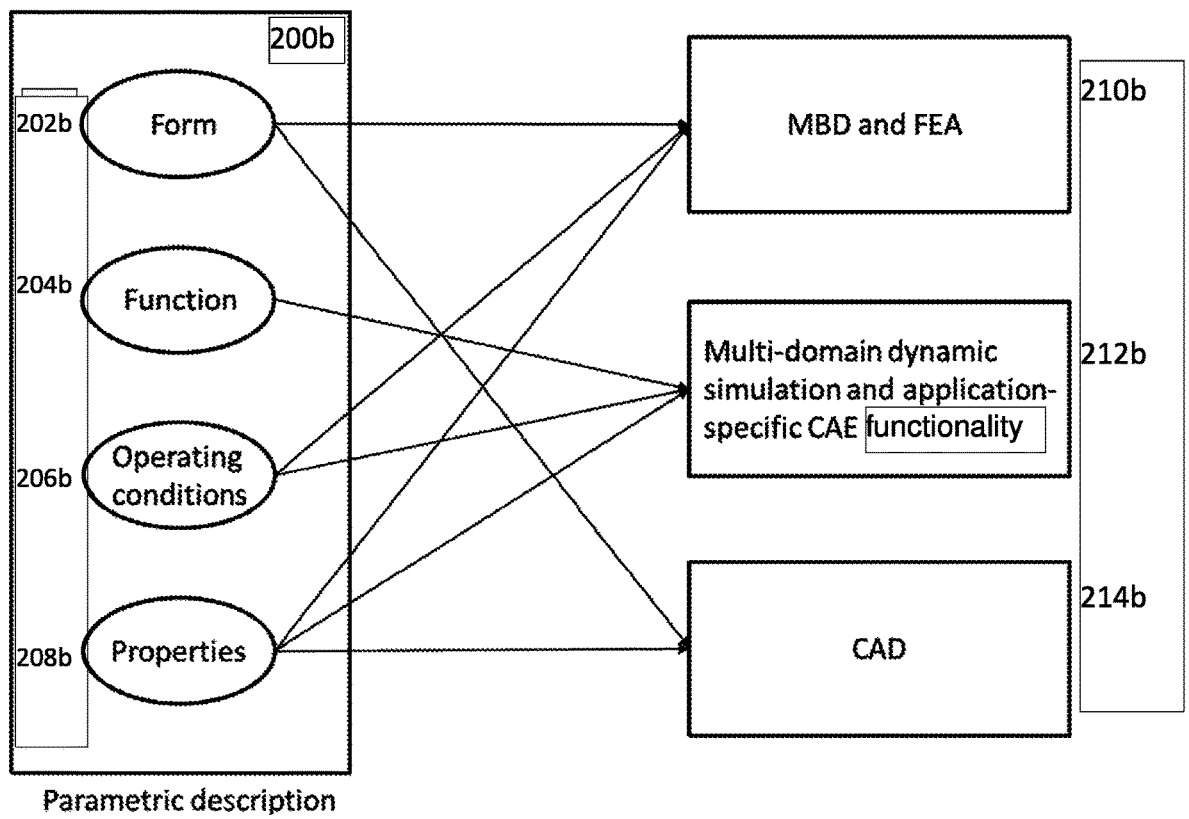
FIG. 2b illustrates schematically a specific example of a parametric description.

FIG. 2b illustrates schematically a specific example of a parametric description 200b, which is similar to that of FIG. 2a. The CAE functionalities shown in FIG. 2b are: MBD and FEA 210b, Multi-domain dynamic simulation and application-specific CAE tools 212b, and CAD 214b.

In this example, the "parametric description" 200b includes the following datasets: form 202b, function 204b, properties 208b, and operating conditions 206b. These datasets can be non-overlapping.

Form 202b can include data relating to geometry.

Properties 208b can include the material properties of the components, plus component specific properties such as the dynamic capacity of a bearing, the surface roughness of a gear tooth flank, the viscosity of a lubricant, the Goodman diagram of a shaft material, the resistivity of electric machine windings etc.

Operating conditions 206b can include principally the power, speed, torque of the rotating machinery, either as a time history or a residency histogram, but can also include temperature, humidity etc.

Function 204b can define the way in which the product, sub-systems and components perform their primary function—for example, the function of a roller bearing is to provide support to a shaft whilst allowing it to rotate, assemble a shaft and a bearing together and the combined function is to provide a rotating shaft to which loads can be applied, mount a gear on the shaft, mesh it with a similarly mounted gear and the combined function is to change speed and torque.

The table below is a tabular representation of FIG. 2b, with the same reference numbers used for convenience. In this way, the table shows what data from the parametric description 200b is used by the different CAE functionalities to perform different types of analysis.

| CAE functionality | 200b Parametric description | | | |
|---|---|---|---|---|
| | 202b Form | 204b Function | 206b Operating conditions | 208b Properties |
| 210b MBD & FEA | Yes | | Yes | Yes |
| 212b Multi-domain dynamic simulation; Application-specific CAE functionality | | Yes | Yes | Yes |
| 214b CAD | Yes | | | Yes |

Importantly the above table, and also FIGS. 2a and 2b, show that one parametric description 200a, 200b can enable multiple analysis types to be performed in one CAE tool, rather than needing a separate tool for each analysis.

Traditional CAE tools can each only provide one CAE functionality. In order to perform that functionality the tools may require a subset of the information that is provided by the parametric description that is described above. For example: CAD 214b provides form (geometry) 202b and some aspects of properties 208b (for example, material density but not Young's modulus), but does not include operating conditions 206b or function 204b. MBD and FEA functionalities 210b require models that include certain aspects of form 202b, function 204b, properties 208b and operating conditions 206b, but only those that are pertinent to the specific failure mode that is being simulated. Models in multi-domain dynamic simulation and application-specific CAE functionalities 212b use the aspects of function 204b, properties 208b and operating conditions 206b that are pertinent to the specific failure mode that is being simulated, but no form 202b.

Depending on which CAE functionality 210b, 212b, 214b is employed, the engineer has to select data from one or more of the four data sets to create an analytical model suitable for the analysis being performed.

Advantageously, examples described herein can include a single CAE tool that can perform multiple CAE functionalities. This is, at least in part, due to the single parametric description that provides a common source of information for the different CAE functionalities.

Figure 3:
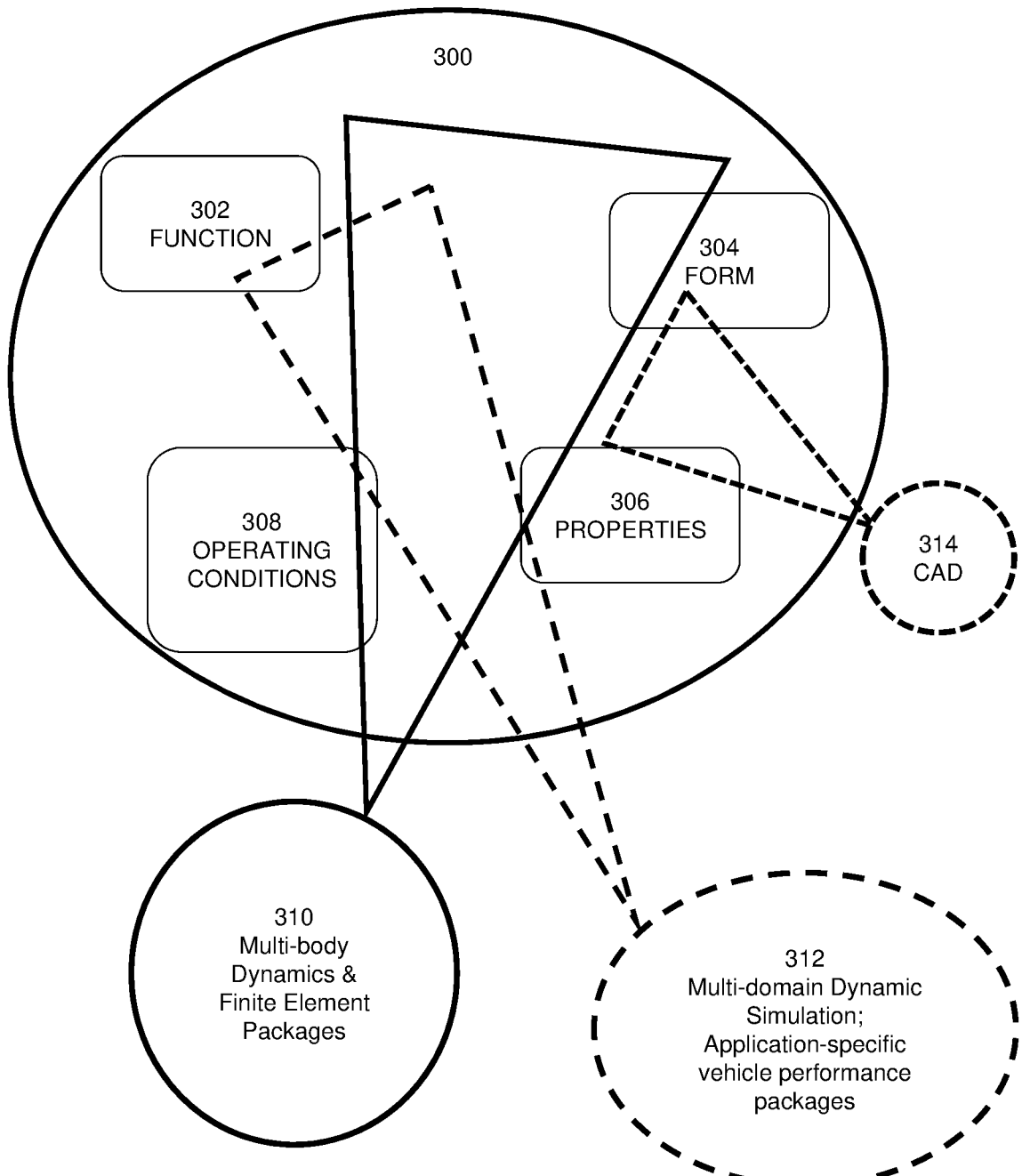
FIG. 3 illustrates another representation of a parametric description formed of four non-overlapping data sets.

FIG. 3 illustrates another representation of a parametric description 300 formed of four non-overlapping data sets 302, 304, 306, 308. The relevant data set for multi-body dynamics or finite element packages analysis 310 is represented by the triangular set overlapping part of the Form set 304, Properties set 306 and Operating Conditions set 308. Similarly, the relevant data set for multi-domain dynamic simulation or application-specific vehicle performance packages analysis 312 is represented by the triangular set overlapping part of the Function set 302, Properties set 306 and Operating Conditions set 308. Likewise, the relevant data for CAD analysis 314 is represented by the triangular set overlapping part of the Form set 304 and the Properties set 306. In traditional CAE tools, the absence of all four types of data leads to discontinuities in the work flow within the design process.

Figure 4:
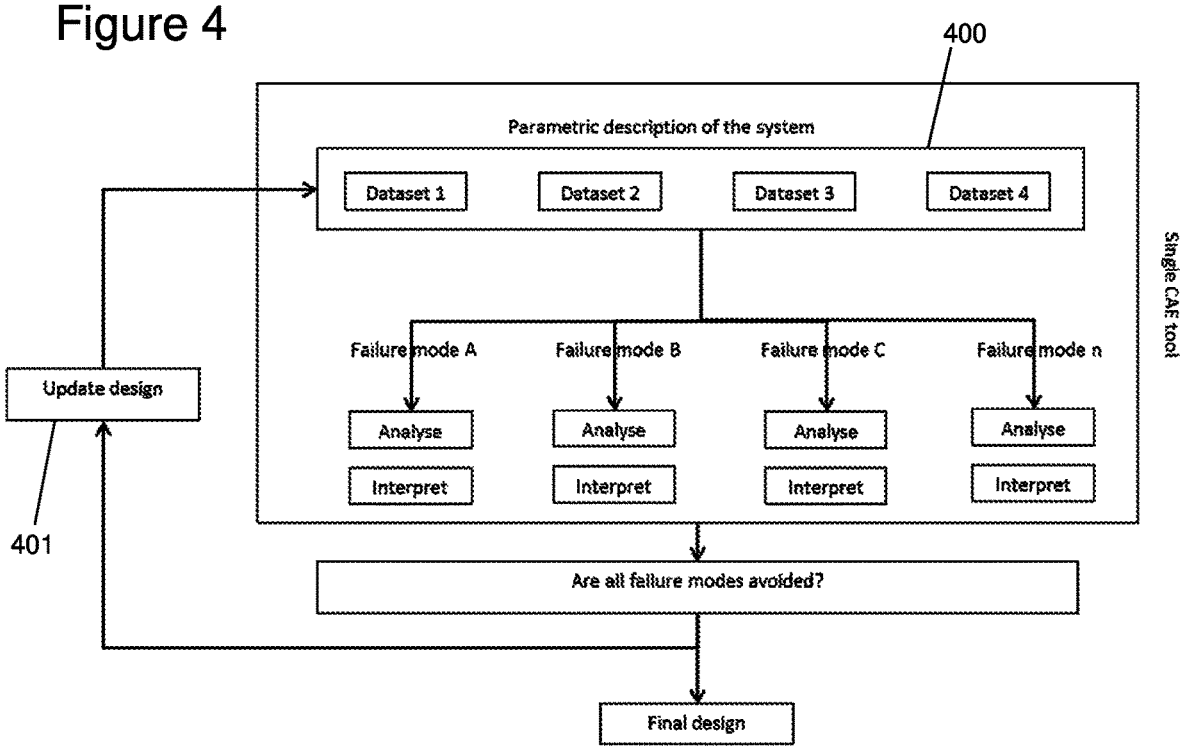
FIG. 4 shows how a parametric description of a driveline can be used to determine a plurality of performance metrics of the driveline.

FIG. 4 shows how a parametric description 400, such as the ones described above, can be used to determine a plurality of performance metrics of the driveline, and hence whether or not a plurality of performance targets are satisfied and failure modes avoided. In contrast to FIG. 1, the parametric description 400 and single CAE tool of FIG. 4 advantageously do not require an individual model to be built manually for each CAE functionality, and also do not require data to be moved between the different CAE functionalities. In contrast, a mathematical model can be built for each analysis type, automatically selecting data from the parametric description 400.

FIG. 4 illustrates how the invention addresses discontinuities in the workflow that can occur in traditional CAE tools, where a parametric description with multiple types of datasets is not available. The CAE tool of FIG. 4 can run a plurality of simulations to determine the performance metrics of the driveline or the likelihood of the different failure modes. The results of each of these simulations arise from mathematical models of the operating performance of the driveline, with each physical phenomenon requiring a different algorithm, and all algorithms being available within the single CAE tool so as to maximise engineering productivity.

FIG. 4 shows schematically a step 401 of updating the design of the driveline. This can involve comparing one or more performance metrics that are calculated by the CAE tool with one more performance targets. If a performance target is not satisfied, such that an associated failure mode is not avoided, then the software can update the design at step 401 by adjusting the parametric description 400. Then the CAE tool can be applied to the new parametric description 400 to determine whether or not all of the failure modes are avoided for the new design. Further details of how the design can be updated will be provided below.

CAE tools can be used to calculate transmission error (TE) by running the gear through a mesh cycle and calculating the variation in mesh stiffness. Transmission error is the deviation of the rotation angle from the nominal value. The resulting TE can be used as an excitation to the driveline structure, leading to a forced response analysis and prediction of the vibration at the surface of the housing and, if required, a prediction of radiated noise. This process can be set up specifically for gears and drivelines. The model can be parametric and fast to run, and the post processing can be set up in the form of accessible graphical user interfaces.

In all of these potential failure modes and the corresponding calculations thereof, one key influencing factor is misalignment. Misalignment can be caused by components deflecting such that their position, or at least a position of part of the component, relative to another component changes. Within the rolling element bearing misalignment can increase the stress for each fatigue cycle and reduce bearing life. For the gears, misalignment can increase the contact pressure between the mating teeth which reduces resistance to fatigue and increases the likelihood of scuffing. Misalignment can also alter the contact patch between contacting gears, thereby increasing TE and affecting the oil film between the gears, thereby increasing gear mesh power loss and reducing overall driveline efficiency.

It can be advantageous to calculate the deflection of one or more components of the driveline. As indicated above, such deflections can result in misalignment of gears and bearings under operating conditions, as one example. To calculate such deflections/misalignments of gears and bearings, a mathematical representation of the full gearbox sub-system, consisting of shafts, bearings and gears, can be used.

Gear forces are generated at the gear meshes due to applied torque, leading to shaft deflections, load-dependent deflection of the bearings, and housing distortion. The result, both in practice and in calculation, is a misalignment of the gears and bearings as the gearbox transmits power, which affects the aforementioned failure modes/performance targets of gear fatigue, scuffing, TE and efficiency, and bearing fatigue.

A limitation of generalist tools for driveline design is that thermal influences are not included accurately. However, often the key mechanical parts (shafts, bearings, gears, rotors, housings) of a driveline are made of metals that expand when heated, so the thermal influences can be important for structural and other types of analysis.

In some applications, it can be advantageous to know what the temperature distribution is within a sub-structure (for example, one or more of the components) of the driveline. As the driveline transmits power, friction generates heat at the gears and bearings. Also, as power is converted in electro-mechanical drivelines there are power losses in the electric machine and power electronics. The generated heat is typically removed to the environment, either through direct conduction through to the housing and thus the surroundings, or indirectly to oil, and from there either to the housing, or by extracting the oil to some form of radiator.

It has not been possible to accurately account for thermal influences in known tools for driveline design because, typically, different models are required for different tools, which require different data representative of the driveline. For example, a driveline can be modelled differently, with a different choice of discretisation nodes, for thermal and structural analysis. There can also be a technical difficulty of applying a temperature distribution to a mechanical model because the nodes can be in different places.

Simulation-led design of a driveline can be an essential tool for achieving a design that is fit for purpose. Examples described herein can advantageously predict thermal behaviour when performing modelling and design. For example, a temperature distribution can be calculated from a parametric description such that an accurate performance metric of the driveline can be determined. In turn, the performance metric can enable an improved design of the driveline to be generated. The improved design process can result in a driveline that is less likely to fail due to deflections caused by thermal effects. For instance, the determination of a more accurate temperature distribution in the driveline can enable a more accurate efficiency metric and more accurate values of deflections, which in turn can result in more accurate durability metrics. In this way, the likelihood of early failure due to an underestimating of misalignment can be reduced.

The result is that thermal considerations cannot be included with sufficient accuracy in the practical design of drivelines using known CAE tools. Thus, drivelines are designed with sub-optimal performance and/or the risk that they will fail in test and development or, even worse, in operation. Indeed, such failures may not even appear as thermal failures—for example, it could be that the gear designer designed the micro-geometry of gears incorrectly (failing to account for thermal effects), leading to poor tooth contact, high stress, and premature but apparently-conventional fatigue failure.

Thermal performance is critically important in certain aerospace applications. It is a certification requirement of helicopter drivelines that they are able to operate for a certain period of time after the event of loss of lubrication, so as to ensure the safe delivery of the occupants in event of an emergency. However, such functionality is typically achieved through replicating the design features of previous designs followed by slow and very expensive testing of prototype units.

Dynamic performance is also critically important in applications such as passenger cars, where the reduction in usage of internal combustion engines means that gear noise is no longer masked by the noise of the engine. To predict whether a driveline is noisy it is necessary to predict the dynamic properties of the driveline, which can involve constructing a mathematical model of the masses and stiffnesses of the driveline, plus the boundary conditions. The dynamic model can then be excited by driveline system excitations, which can include the transmission error, electro-magnetic torque ripple, and/or radial forces on the stator teeth. This dynamic model is described in more detail below with reference to Equation 4, whereby the system excitations are included in the applied forces F. If the driveline is not modelled accurately (for example by not taking into account thermal effects and associated deflections), then a performance target associated with gear noise may not be satisfied by a driveline built according to the design.

Some application-specific CAE tools calculate power losses for various components, which can provide useful information regarding thermal performance. These power losses can advantageously be modelled as heat inputs to the driveline system, as will be discussed below.

Figure 5:
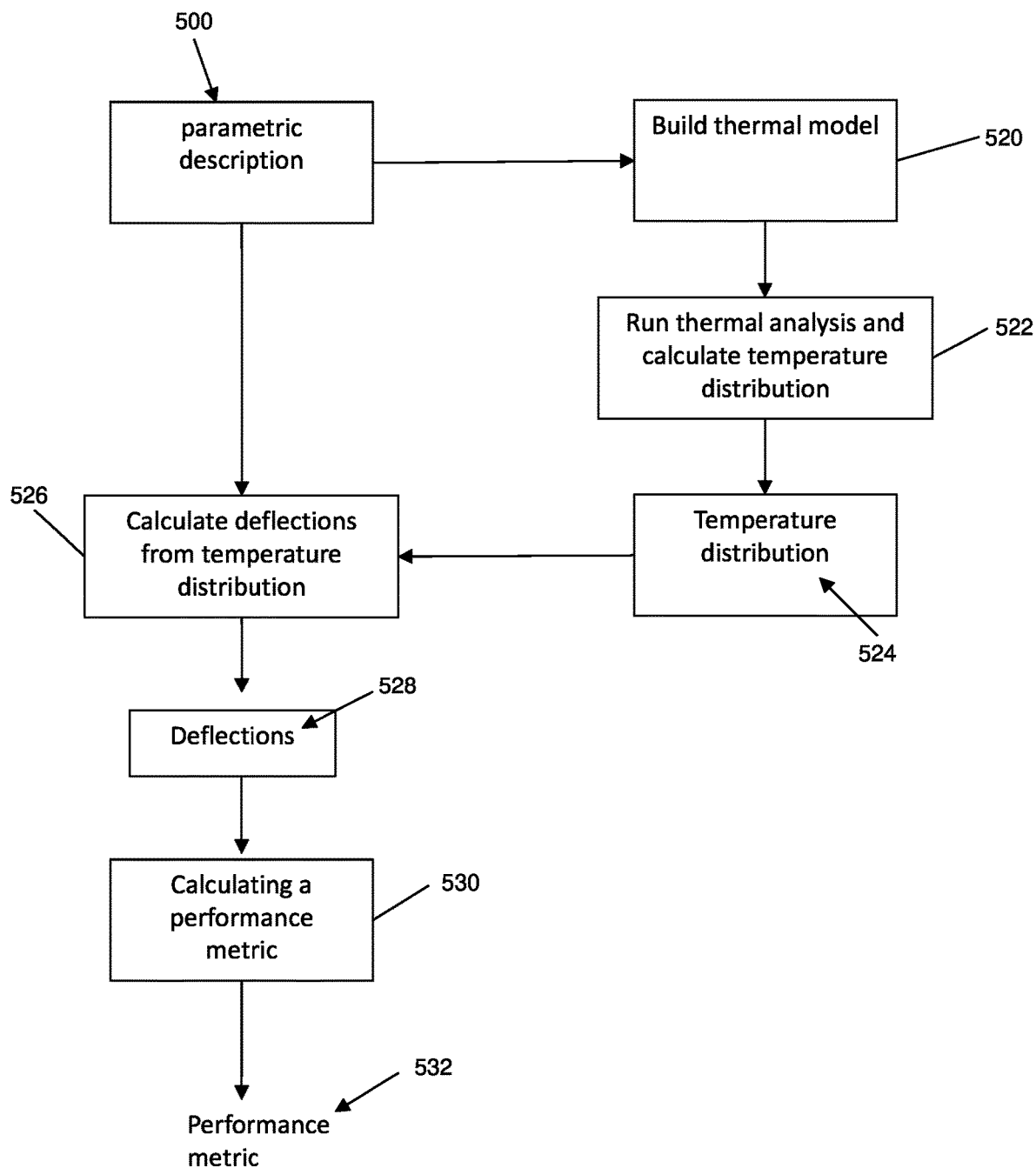
FIG. 5 shows a schematic view of a computer-implemented method for modelling a driveline that uses a thermal model and performs a deflection calculation.

FIG. 5 shows a schematic view of a computer-implemented method for modelling a driveline. The method processes a parametric description of the driveline 500, and calculates a performance metric 532 that is representative of the performance of the driveline. Other examples are described herein. As will be discussed below, the method of FIG. 5 calculates a deflection 528 of one or more components in the driveline due to a temperature distribution 524 in the driveline, and the performance metric 532 is calculated based on at least that deflection. Examples of a performance metric 532 include misalignment between different parts of components in the driveline, efficiency, durability, and transmission error. In some examples, the performance metric 532 can be a representation of the calculated deflection.

In some examples, the method can also calculate structural deflections due to forces that occur in the driveline. The performance metric 532 can then be calculated based on both structural and thermal deflections.

At step 520, the method creates a thermal model of the driveline from the parametric description 500. The thermal model can be a discrete thermal model or a continuous thermal model. Discrete thermal models can include lumped parameter thermal network models, and meshed finite element thermal models.

A discretised lumped parameter thermal network model of the driveline may contain thermal inertias or capacitances connected by thermal links, with heat sources providing an input of heat flux. Thermal links can include heat transfer due to conduction, convention, and radiation. The processing at step 520 can determine the properties of these capacitances and conductances, and their connections, from the parametric description 500 of the driveline and its components.

In some embodiments, the method can automatically process the parametric description to identify where there are power losses in the driveline in order to build the thermal model. For instance, the method can determine the power loss of one or more components in the driveline (optionally for specific operating conditions), and then determine whether or not the component should be modelled as a heat source based on the determined power loss value. For instance, if the power loss value is greater than a power-loss-threshold, then the component can be modelled as a heat source. The heat source can be included at a location in the model that corresponds to the location of the component that was determined to have the associated power losses. In this way, the method can recognise that heat will be generated at locations in the driveline where there are power losses. Locations of power losses can include places where there is friction between contacting surfaces (gears and bearings), current passing through wiring (e.g. electric machine stators and power electronics), drag losses at seals, or movement of fluid causing drag losses (churning or windage).

In some examples, the thermal model that is built at step 520 is a lumped parameter thermal network model. The method can discretise such a model in several different ways, including:

a) Creating a lumped parameter thermal network, based on the parametric description, with one thermal node per component. However, this approach may not check whether the thermal model is suitable for the thermal analysis being carried out. The heat flux to and from a thermal node associated with a component can depend on the component's shape, size, material, heat capacity, and temperature compared to surrounding components. It may be that a model with one thermal node per component is unreasonably detailed, with a consequential penalty in analysis time, or that it is insufficiently detailed, meaning that the results may be insufficiently accurate. It is possible that the model may include details in one area that are excessive whilst missing necessary fidelity in other areas, leading to both slow computation and inaccuracy.

b) An alternative to the one-node-per-component discretisation of a lumped parameter thermal network described in a) above is manual discretisation, in which the user specifies the number of thermal nodes required for each component, or which components to lump together into a single thermal node. The method at step 520 can then build thermal model based on both user input and the parametric description 500. However, an engineer may need to spend time building and refining the model, and checking to see how the analysis results vary as the level of discretisation varies, for such manual discretisation. The engineer can aim to seek reassurance that the model is suitably accurate without being excessively detailed, but the process can be time-consuming and could end up being carried out by the most highly qualified and hence expensive engineer within the organisation, with resulting adverse impacts on project cost and timing.

c) Advantageously, an analytical formulation can be used to create a lumped parameter thermal network that is optimised for speed and accuracy of analysis. The method at step 520 can perform automatic discretisation of the model so as to retain thermal nodes at the points in the model that are appropriate for accurately describing the thermal behaviour of the driveline. As discussed above, the method can include power losses in the driveline in the lumped parameter thermal network as heat sources. The method can calculate values of thermal conductance and thermal capacitance for each component, using data from the parametric description of the driveline. From these values, the method can determine a ratio of thermal conductance to thermal capacitance for a component. The method can make this determination from information provided in the parametric description 500 such as material properties, and size and shape of the component. Alternatively, the ratio of thermal conductance to thermal capacitance may be directly available from the parametric description 500. The method can then compare the ratio of thermal conductance to thermal capacitance with one or more thermal-conductance-to-thermal-capacitance-ratio-threshold values. The method can advantageously model one or more of the driveline components as either a thermal conductance or a thermal node, depending on the ratio of thermal conductance to thermal capacitance. For instance, the method can model driveline components with a ratio that is higher than a thermal-conductance-to-thermal-capacitance-ratio-threshold value as thermal conductances. The method can model driveline components with a ratio that is lower than a thermal-conductance-to-thermal-capacitance-ratio-threshold value as thermal nodes. Thus the lumped parameter thermal network can be built and discretized automatically, without the need for manual input or modelling decisions from the user.

For example, consider a spacer separating two bearings mounted on the same shaft. The spacer is a thin-walled cylinder with very small mass. Its shape and position means that it conducts heat between the two bearings. Approach c) would employ the method of automatically determining whether to treat a component as a thermal mass or a thermal conductance based on the ratio of thermal conductance to thermal capacitance, and would therefore classify the spacer as a thermal conductance rather than a thermal node. This is appropriate because the thermal mass is negligible, but the effect of conducting heat between the bearings is significant, particularly if their temperature difference is high. Method a) would have classified the spacer as a thermal node, and method b) would have required an engineer to manually decide the most appropriate way to model that component.

The lumped parameter thermal model can be calculated for the whole driveline, including a gearbox and a motor if these components are present in the driveline. If the driveline includes power electronics, these can also be included in the lumped parameter thermal model as heat sources, with associated thermal conductances, as discussed above.

Time savings and error avoidance can be achieved by the automatic set up of the thermal inputs at components that have associated power losses. Also, as will be discussed below, heat flux values can be automatically determined at step 520 based on the operating conditions of the components.

Heat transfer can occur by different mechanisms including conduction, convection, and radiation. Conduction is straightforward, since thermal conductivity of solid metal components can be straightforward to calculate. For example, the method can calculate conduction heat transfer through bearings based on static analysis of the roller bearing and the contact area generated by the load dependent stiffness. Usually, heat transfer by radiation is small compared to conduction and convection. Heat transfer by convection, however, can be more difficult to determine. For example, the heat at a gear mesh is generated within the oil film and the heat transfer to the metal of the gear is determined by the convection Heat Transfer Coefficient (HTC) between the gear and the oil. These HTCs are difficult to predict with certainty. A hot metal surface sitting in still air will lose heat at a much slower rate than one experiencing gentle, laminar air flow over its surface, and even more so compared to one with rapid, turbulent air flow.

The thermal model built in step 520 can include values for HTCs associated with the driveline. These HTCs can relate to heat transfer between the internal driveline components and the lubricant, between the lubricant and the housing, and/or between the housing and the environment.

The values of HTCs can be determined in several ways, including:

i) The method can use default values for the HTCs.
ii) A user can provide input representative of HTC values to be used, which can involve the modifying of any default values.
iii) The method can automatically calculate the HTCs. The method can calculate convection HTCs using a Computation Fluid Dynamics (CFD) model, or using a simple lumped parameter thermal network model (described later in this document).

At step 522, the method calculates a thermal distribution 524 based on the thermal model that is built at step 520. For instance, at step 522, the method can calculate power losses for one or more of the components, based on calculated efficiency values, to determine an amount of heat that is generated at that component. The method can associate this amount of heat with the corresponding heat source in the thermal model. In order to determine the temperature distribution 524, step 522 may calculate heat flux in the driveline. In this way, the temperature distribution can comprise a temperature value associated with each of the modes in the thermal model. In some examples, the temperature distribution can include a plurality of temperature values for a single component.

Heat flux into the lumped parameter thermal network occurs wherever there is a power loss associated with any component. The values of these heat fluxes can be determined in several ways, including:

i) The values of these heat fluxes can be defined by the user, and these can be combined with the thermal model that was built at step 520 to perform thermal analysis 522 and calculate the temperature distribution 524 in the driveline.
ii) The method can automatically determine values of the heat fluxes. For instance, when building the thermal model, the method may have performed known efficiency/power loss calculations for one or more components in the driveline to determine efficiency/power loss values. Then, when building the thermal model at step 520, the method can determine the values of associated heat fluxes based on the efficiency/power loss values as well as the parametric description 500. For instance, step 520 may process operating conditions from the parametric description 500 to determine the amount of energy at various components in the driveline.

The method can run thermal analyses at step 522 using a lumped parameter thermal network model, leading to values of the temperature being obtained at discrete thermal nodes. In other words, the term "lumped" is equivalent to the term "discretised". If a thermal profile throughout the full structure is to be calculated, then a further thermal calculation can carried out based on the 3D structure of the driveline (as determined from the parametric description 500), based on the thermal properties of the driveline components. Thus, a smooth temperature profile can be obtained throughout all the mechanical components in the driveline.

The processing at step 522 can include application of Equation 1 below, which describes how to calculate heat flux in a thermal network model:

$$Q'=dT/R \qquad \text{(Equation 1)}$$

where Q' is the heat flux (derivative of heat Q with respect to time), dT is the temperature difference, and R is the thermal resistance.

Thermal resistance R can be calculated in different ways for different components and heat transfer methods. For example, for convection heat transfer between a component and a fluid, R is given by Equation 2a:

$$R = 1/h\,A \qquad \text{(Equation 2a)}$$

where h is the heat transfer coefficient and A is the contacting surface area. For conduction in solid components, Equation 2b describes how to calculate the thermal resistance:

$$R = L/k\,A \qquad \text{(Equation 2b)}$$

where L is the characteristic length, k is thermal conductivity, and A is the surface area. The parameter k is a material property, and the parameters A and L are geometric, all defined within the parametric description of the driveline. For conduction in bearings, the thermal resistance can be calculated using Equation 2c:

$$R = \ln(r_0/r_1)/2\pi b\,k \qquad \text{(Equation 2c)}$$

where $r_0$ and $r_1$ are the inner and outer radii of the bearing, b is the face width, and k is the thermal conductivity.

The method can use Equations 1 and 2 at step 522 to calculate the heat fluxes between all nodes in the thermal model, and hence the temperature distribution 522 within the driveline.

Further details of how to set up and run a thermal network is provided in the thesis titled "Thermal modelling of an FZG test gearbox" by CARLOS PRAKASH DEL VALLE of KTH Industrial Engineering and Management Machine Design—in particular section 3.2 of this document.

The method of building a thermal model at step 520 based on a parametric description 500 and calculating a thermal distribution at step 522 can have several advantages:

1) The thermal model can encompass the entire driveline, including all components and sub-assemblies. This is an advantage over application-specific CAE tools, which consider only a specific component or sub-assembly in isolation.
2) As will be discussed below, the temperature distribution that is calculated based on the thermal model can be used to achieve a more accurate calculation of driveline deflections by including the effect of thermal expansion. Accurate deflections can be used to more accurately calculate efficiency, durability, and other performance metrics. This is an advantage over application-specific CAE tools, which calculate a temperature distribution but do not use it to improve the calculation of deflections.
3) A lumped-parameter thermal network model can be created automatically and optimised for speed and accuracy, especially as described in approach c) above.

At step 526, the method determines a deflection of one or more components of the driveline caused by the thermal distribution 524, based on the parametric description 500 and the temperature distribution 524. In some examples, this can be considered as applying the temperature distribution 524 to a structural model of the driveline. Such a structural model of the driveline may be available in the parametric description 500, or may be derivable from the parametric description 500. Most of the drivetrain components can be modelled as FE meshed components in the structural model, in some examples.

In some examples, the thermal model (which may be a mesh model) and the structural model mesh may be identical. Therefore, there is a one-to-one correspondence between thermal nodes and structural nodes and the temperature distribution 524 can be applied directly to the structural nodes. The temperature distribution 524 can be applied to the structural model by node position or by node number.

In some examples, the structural model and the thermal model can be provided as meshes that are not identical. In these examples, step 526 can involve interpolating the temperature distribution between the nodes of the thermal model in order to determine interpolated-temperature-values at the nodes of the structural model. For instance, such interpolation can be used to combine a thermal model that is a relatively simple lumped model having only a few nodes with a FE structural model that has many nodes, that could otherwise be considered as incompatible. Step 526 can then calculate the deflections at the nodes of the structural model based on the interpolated-temperature-values.

At step 526, the method can calculate deflection for every node in the structural model of the driveline.

The method can calculate deflections caused by thermal expansion using Equation 3:

$$dX = \text{alpha} * X * dT \qquad \text{(Equation 3)}$$

where:
dX is the deflection,
alpha is a dimensionless thermal expansion coefficient (a material property that can be included in the parametric description 500),
X is the original position of the node (which can be included in the parametric description 500, or determined from the parametric description 500 by the method building a structural model of the driveline). X can be provided as a vector that defines the positions and rotations of every node, in three dimensions, in the structural model. Therefore, the position of each node can be defined in six degrees of freedom, and
dT is the change in temperature, as determined from the temperature distribution 524 that is calculated at step 522. dT can be the difference between the node's temperature and a defined temperature (usually 25° C.), such that the material expands if T>25° C. and contracts if T<25° C.

Optionally, at step 526, the method can calculate deflections caused by forces that occur in the driveline. Such deflections can be considered as being caused by structural forces. In some examples, the deflections can be calculated by i) static analysis, or ii) dynamic analysis of the driveline system. The driveline system can be considered as all of the nodes in the complete driveline. These methods are described in more detail below.

i) Static analysis resolves the applied forces on all components of the driveline to calculate deflections, taking into account that some component stiffnesses may be load-dependent. Therefore the method needs to iterate over the forces, deflections, and stiffnesses until convergence is achieved. The method assumes that forces and displacements are not time-varying, other than rotating at a constant speed as specified in operating conditions that are provided as part of the parametric description 500.

ii) Dynamic analysis, in contrast to static analysis, permits the deflections and applied forces to vary with time. This allows time-varying excitations to be included in the analysis. Time-varying excitations can include transmission error, engine torque ripple, electric machine torque ripple, and electric machine radial forces. In dynamic analysis the deflections can be determined by solving the driveline system's equation of motion, represented in a matrix formulation in Equation 4:

$$MX'' + CX' + KX = F \qquad \text{(Equation 4)}$$

where:
M is the driveline system mass matrix (which can be included in the parametric description 500, or derived therefrom),
C is the driveline system damping matrix (which can be included in the parametric description 500, or derived therefrom),
K is the driveline system stiffness matrix (which can be included in the parametric description 500, or derived therefrom),
F is the applied force (which can be included in the parametric description 500, or derived therefrom, for example from "operating conditions" stored in the parametric description 500), and
the vector X defines the positions and rotations of every node in the structural model in six degrees of freedom, in the same way as described above for Equation 3. The notation X' means the derivative of X with respect to time.

The structural model can be solved either statically or dynamically, as described above. Both of these methods calculate the deflections in six degrees-of-freedom for every node in the driveline structural model.

The method can solve the matrix equation for X to determine the new positions and rotations of the nodes in the structural model. Deflections can be considered as the difference between new position/rotation values and starting position/rotation values of the nodes.

In examples where step 526 calculates deflections of nodes due to thermal effects and structural effects, the method can combine these deflections into an overall-deflection-value. For example, the method can simply sum the individual deflection values together.

For driveline components that are bearings, the method can calculate deflections 528 using an alternative method of applying the temperature distribution to the structural model. The structural model can include nodes that correspond to one or more of the inner raceway, outer raceway, rotating elements, and connected components. At step 526, the method can apply the temperature distribution 524 to determine temperature values at these nodes of the structural model. Then the method can determine a thermal expansion at these nodes, and determine how that expansion alters the operating clearance of the bearing. The operating clearance can therefore be different from the radial internal clearance, which is a standard value from the bearing manufacturer. The operating clearance is an example of a representation of a deflection 528, which can be used to determine a more accurate performance metric 532.

At step 530, the method calculates a performance metric 532 of the driveline based on the determined deflection 528 of the one or more components. As a non-limiting example, the performance metric can be misalignment between two components in the driveline. The method can calculate misalignment by adding or subtracting the deflection values 528 of two components, or nodes in a structural model of the driveline, in order to calculate a change in the relative locations of the nodes/components. Other performance metrics will be described below.

The method can advantageously take into account deflections of components caused by thermal effects such that a more accurate performance metric 530 can be calculated. Therefore, the driveline can be modelled more accurately.

Figure 6:
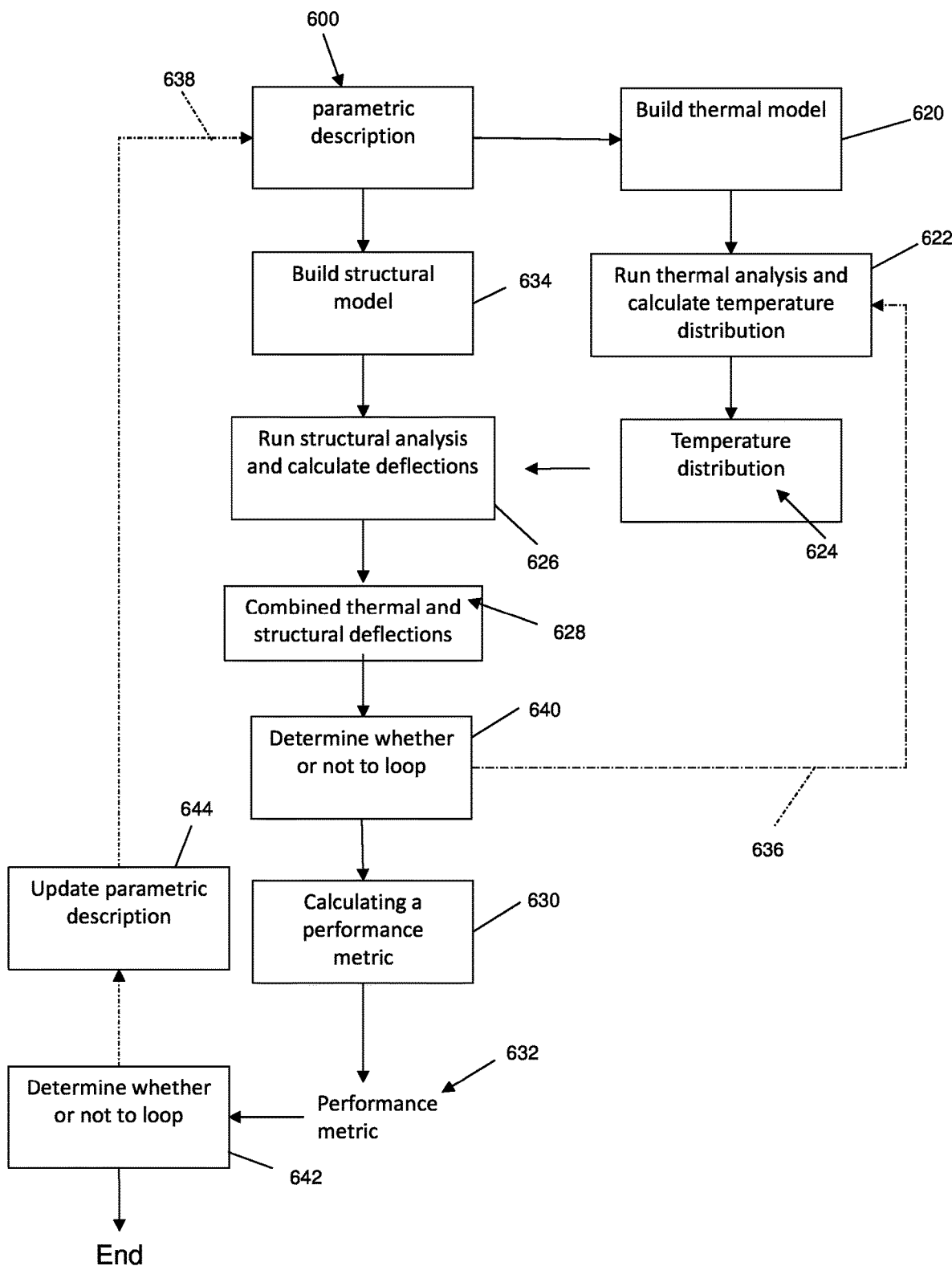
FIG. 6 shows a schematic view of another computer-implemented method for modelling a driveline, and optionally for designing a driveline, that uses a thermal and structural model and calculates deflections due to both.

FIG. 6 shows a schematic view of another computer-implemented method for modelling a driveline, and optionally for designing a driveline. Features of FIG. 6 that have corresponding features in FIG. 5 will be given reference numbers in the 600 series and will not necessarily be described again here.

In this example, the method includes a step 634 of building a structural model based on the parametric description 600. At step 626, the method then applies the calculated temperature distribution 624 to the structural model to determine deflections caused by thermal effects as discussed above. In this example, at step 626 the method also calculates structural deflections caused by forces within the driveline. An example of how to calculate such structural deflections is also provided above. Therefore, the deflections 628 that are calculated at step 626 are a combination of thermal and structural deflections.

Also, FIG. 6 shows two optional iterative loops 636, 638 that can be provided independently of each other or together. The first iterative loop 636 applies the determined deflections 628 to the information that is processed at step 622 so that the temperature distribution 624 can be calculated for the deflected components in the driveline. The second iterative loop 638 can modify the parametric description 600, thereby redesigning the driveline, based on the calculated performance metric 632.

In relation to the first iterative loop 636, after step 622 has been performed for the first time (for the initial calculation of the temperature distribution 624), for each subsequent iteration the method step 622 can recalculate the temperature distribution 624 for one or more components of the driveline based on the thermal model and also the calculated deflections 628. In this example the calculated deflections 628 are due to structural and thermal effects, although in other examples the calculated deflections 628 may be due to thermal effects and not necessarily structural effects. Then the method repeating steps 626 and 630 for the recalculated temperature distribution.

In some examples, the method can include the functionality of determining whether or not to go around the first iterative loop 636. This functionality is shown in FIG. 6 as step 640. At step 640, the method can compare the temperature distribution 624 and/or deflections 628 with one or more loop-end-conditions. If the one or more loop-end-conditions are not satisfied, then the method returns to step 622 to recalculate the temperature distribution 624 for the one or more components of the driveline based on the thermal model and also the determined deflection 628. If the one or more loop-end-conditions are satisfied, then the method can move on to step 630 to calculate the performance metric 632.

In some examples, the first iterative loop 636 that is shown in FIG. 6 can be implemented differently such that, if the one or more loop-end-conditions are not satisfied, then the method returns to step 620 to rebuild the thermal model based on the parametric description 600 and also the determined deflection 628.

In relation to the second iterative loop 638, the method can optionally comprise the step 644 of updating the parametric description 600 based on the performance metric 632 of the driveline. After the parametric description 600 has been updated, the method can repeat steps 620, 622, 634, 626 and 630 for the updated parametric description.

In this example, the method can include the functionality of determining whether or not to go around the second iterative loop 638. This functionality is shown in FIG. 6 as step 642. At step 642, the method can compare the performance metric 632 with one or more loop-end-conditions. If the one or more loop-end-conditions are not satisfied, then the method moves on to step 644 to update the parametric description 600 and then repeats the method of FIG. 6. If the one or more loop-end-conditions are satisfied, then the method ends.

Non-limiting examples of how loop-end-conditions can be applied include:

Determining a rate of convergence for the value that is being compared with the loop-end-conditions, and comparing the rate of convergence with a threshold-value that is indicative of the value being sufficiently settled. If the threshold-value is satisfied, then determining that the loop-end-condition has been satisfied. In this way, the loop can be repeated until the values do not change within a user-specified tolerance.

Determining a number of iterations around the loop that have been performed, and comparing this number with a maximum number of iterations. If the maximum number has been reached, then determining that the loop-end-condition has been satisfied.

Comparing the value that is being compared with the loop-end-conditions with a threshold-value that represents acceptable performance, and if the threshold-value is satisfied then determining that the loop-end-condition has been satisfied.

Determining the difference between the performance metric for the current iteration of the loop with the value of the same performance metric calculated on the previous iteration of the loop, and comparing this difference with a threshold-value that represents acceptable convergence. If the difference between the performance metric value on consecutive loops is less than the threshold-value, the determining that the loop-end-condition has been satisfied. This "difference" can be an absolute difference or a relative difference (for example expressed a s a percentage). In this way, the iterative loop can stop iterating when the value is within 1%, for example, of its value from the previous iteration.

The example of FIG. 6 thus includes a structural model of the driveline, derived from the parametric description 600, which can be used for the purposes of calculating loads, deflections, strains, misalignments and hence stresses. This can be achieved by discretising the structural model into a number of nodes and calculating their displacements in six degrees of freedom based on applied structural loads, such as gear forces. Beneficially, these same nodes in the structural model are also subject to an additional displacement due to thermal expansion, which is calculated based on the temperature profile/distribution 624 from the thermal analysis. Changes can occur in all values of deflections, strains and misalignments. These changes can have an impact upon the performance of the key components in the driveline, and advantageously can therefore be accurately represented by the calculated performance metric 632.

Figure 7:
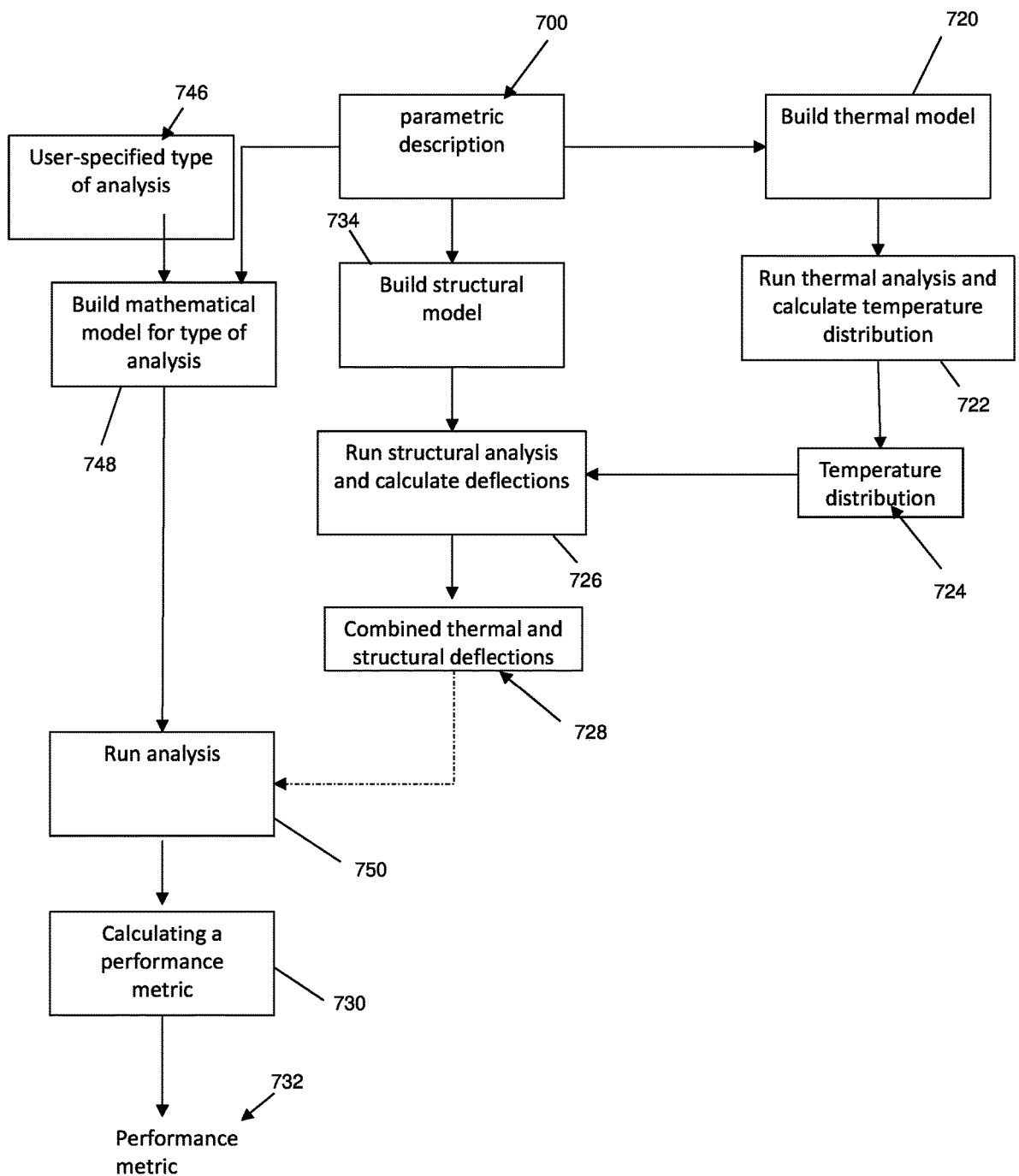
FIG. 7 shows a schematic view of another computer-implemented method for modelling a driveline that includes a further user-specified analysis as well as the thermal and structural models.

FIG. 7 shows a schematic view of another computer-implemented method for modelling a driveline. Features of FIG. 7 that have corresponding features in an earlier figure will be given reference numbers in the 700 series and will not necessarily be described again here. As with all examples disclosed herein, the functionality of FIG. 7 can be combined with any other functionality described herein, including one or both of the iterative loops of FIG. 6.

In FIG. 7, the method receives an indication 746 of one or more types of analysis to be performed for the driveline and then calculates the performance metric 732 of the driveline according to the type of analysis to be performed.

The type of analysis to be performed can relate to: driveline efficiency, efficiency of one or more components in the driveline, lifetime of the driveline, lifetime of one or more components in the driveline, likelihood of gear failure due to fatigue or scuffing, likelihood of bearing failure due to fatigue, gear whine, or any other type of thermal or structural analysis.

The method can receive the indication 746 of one or more types of analysis to be performed for the driveline from a user or can retrieve it from computer memory. For example, a user can provide an input that specifies a type of analysis that is to be performed. Alternatively, the method can automatically process one or more types of analysis at predetermined times, or in a predetermined sequence. In FIG. 7, the indication 746 is representative of a user-specified type of analysis.

At step 748, the method can build a mathematical model of the driveline for the type of analysis that has been specified. The method can identify data in the parametric description 700 that is required for the specified type of analysis, and then build a mathematical model using that identified data that is appropriate for the type of analysis. In some examples, this can include processing a subset of information that is provided by the parametric description 700. Optionally, building the structural model at step 734 and/or building the thermal model at step 720 can involve processing a subset of information that is provided by the parametric description 700, which is different to the subset that is processed at step 748. The method can automatically select data from the parametric description 700 based on the analysis/processing that is to be performed. For example, each analysis/process (e.g., step 722) may have an associated list of the features/data-types from the parametric description 700 that are needed At step 750, the method can run analysis that is appropriate for the specific type of analysis based on the mathematical model that was built at step 748 and also optionally based on the calculated deflections 728. As above, the calculated deflections 728 may be due to thermal effects and optionally also structural effects. Some types of analysis (such as weight, packaging and cost) may not need to process the deflection values 728 that are calculated at step 726.

Then at step 730, the method calculates the performance metric 732 based on the results of the analysis at step 750. Therefore, in this example, the method can be considered as calculating the performance metric 732 indirectly based on the parametric description 700 and optionally indirectly based on the determined deflection 728 of the one or more components (from step 726).

In examples where the performance metric 732 relates to durability, the calculation methods (e.g. ISO standards) can include a measure of misalignment as an input parameter. Advantageously, step 750 of FIG. 7 can determine an accurate value for misalignment using the calculated deflections 728.

In examples where the performance metric 732 relates to efficiency, the processing at step 750 can take into account accurate values for the deflections 728, which will affect the positions of the contacting surfaces and the contact stresses which produce heat from friction.

In examples where the performance metric 732 relates to transmission error, the values can be calculated directly from the position and rotation of contacting gear teeth.

One or more of the examples disclosed herein can take into account that an altered value of misalignment can change the gear contact and bending stress, and thus the predicted fatigue life of the gear can be modified. An altered value of misalignment can change the loaded tooth contact analysis of each gear pair, leading to a change in the predicted gear mesh drag and transmission error.

Deflections within the driveline structure can be used to calculate the load-sharing between planets in a planetary gear set, which would ideally be equal but which in practice never is, owing to system deflections and manufacturing errors. Again, an altered value of displacement in the structural model leads to a modified calculation of the planetary load-sharing.

Bearing fatigue can be determined from loads and deflections that are calculated from the analysis of the performance of the driveline. An altered value of displacement and misalignment owing to the temperature profile can modify the bearing life.

Additionally, in examples where the structural analysis 726 is a dynamic analysis, the driveline system loads and displacements are used to calculate the gear mesh stiffness and bearing stiffness, both of which are load-dependent and thus are also affected by the temperature profile calculated from the thermal model. This is important since these values of stiffness are used in the creation of a dynamic model of the complete driveline. The driveline is subject to excitations such as transmission error, torque ripple, or electric machine radial forces, and the stiffnesses are needed in order to calculate surface vibration and/or radiated noise due to these excitations. These excitations can be included in the applied forces F in Equation 4, and the load-dependent stiffnesses in the stiffness matrix K. All of these influences are dealt with seamlessly.

An electric machine rotor is also subject to deflections and misalignment. The values of these deflections and misalignment can be altered due to thermal expansion of the components. For example, misalignments of the rotor affect the width of the airgap, which has an effect on the electric machine's efficiency. One or more of the temperature distributions described herein can also affect losses in an electric machine. Advantageously, the processing described herein, whereby a thermal model results in a temperature distribution, and this temperature distribution affects driveline deflections and misalignments, can also be applied for electric machines.

For one or more of the analyses that can be performed by FIG. 7, the impact of including an effect of using the temperature distribution 724 is to increase the accuracy of the performance metric 732. Thus, more accurate information can be provided to a design engineer, allowing the design of the driveline to be optimised with greater certainty and potential failures avoided. Drivelines can be quieter and more efficient, and the risk of catastrophic and potentially life-threatening driveline failure due to fatigue or scuffing can be reduced.

All of this can be achieved in a CAE tool that allows this work to be carried out by a non-expert, on a time scale that suits practical design projects, and which facilitates multi-objective design optimisation.

Figure 8B:
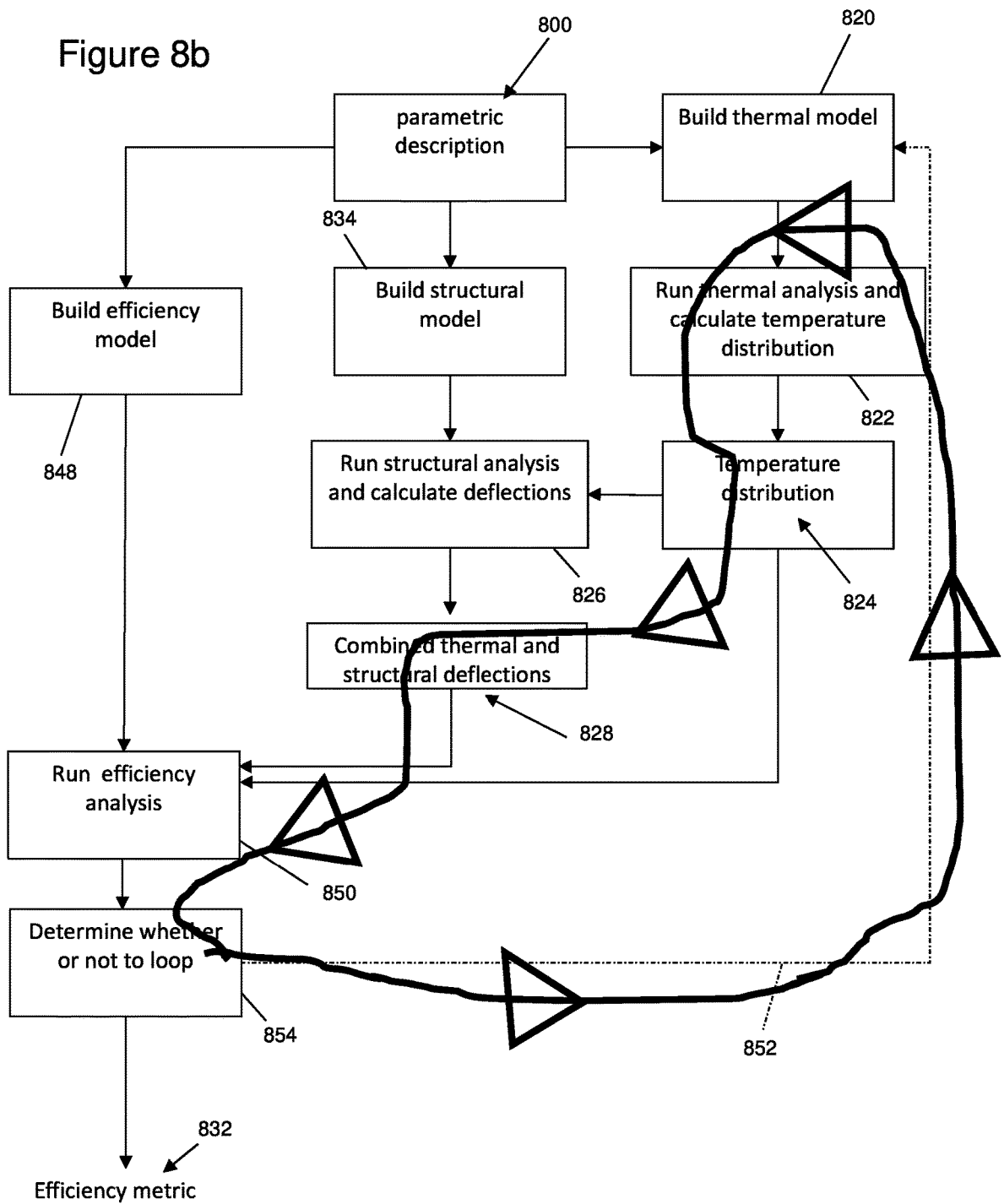
FIG. 8b shows the method of FIG. 8a with the iteration between thermal, structural, and efficiency models identified.

FIGS. 8a and 8b show a schematic view of another computer-implemented method for modelling a driveline, which is similar to FIG. 7. Features of FIGS. 8a and 8b that have corresponding features in an earlier figure will be given reference numbers in the 800 series and will not necessarily be described again here.

In FIGS. 8a and 8b, the performance metric is an efficiency metric 832, and type of analysis that is performed at step 850 is efficiency analysis. In this example, the method does not receive an indication of the type of analysis that is to be performed. For instance, the method of FIGS. 8a and 8b can be considered as one that is hard-coded to perform efficiency analysis (which can be considered as receiving an indication of a type of analysis to be performed for the driveline from computer memory).

For this example, the efficiency analysis at step 850 also uses as an input the temperature distribution 824 that was calculated at step 822. This is because the temperature distribution can affect efficiency directly (for example by changing lubricant viscosity) as well as due to the effect caused by deflections 828.

It will be appreciated that any type of performance analysis can be performed at step 850 in addition to, or instead of, efficiency analysis, and that step 850 can process any required information that is available from elsewhere in the method.

Also, in this example, the efficiency analysis at step 850 can determine a power loss profile of the as part of determining an efficiency model. Advantageously, the power loss calculated at step 850 can be provided as an input to step 850 in order to build an improved thermal model. This can be considered as another optional iterative loop 852, which is highlighted in FIG. 8b.

In this example, at step 854, the method can compare the calculated power loss (or any other calculated characteristic) with one or more of any of the loop-end-conditions described herein. If the one or more loop-end-conditions are not satisfied, then the method moves back to step 820 to rebuild the thermal model based on the calculated power loss (or any other calculated characteristic). Then the method repeats steps 822, 826 850, and 854. If the one or more loop-end-conditions are satisfied, then the method moves on to calculate the efficiency metric 832. Optionally, building the structural model at step 834 can involve processing a subset of information that is provided by the parametric description, which is different to the subset that is processed at step 848.

The automotive industry uses standard drive cycles to measure the fuel economy and emissions of a vehicle. For the processing described herein, each drive cycle can commence with a given external temperature and ambient thermal distribution within the driveline (which is likely to be, but is not necessarily, uniform). This uniform distribution can be used for the calculation of misalignment and hence power loss at t=0. As the drive cycle starts, the method calculates the temperature distribution within the components as the heat inputs change, leading to a change in misalignment (which can be determined from the calculated deflections). The evolution of temperature distribution can be dependent on the initial conditions, the simulation inputs, and the interaction of gear mesh tribology, thermal dissipation and system deflections due to temperature distribution throughout the drive cycle.

Even at steady state, the inclusion of thermal influences can lead to an interesting circle of influence between the thermal, structural and power loss models. The initial gear mesh power loss value can only include the value of misalignment calculated without the influence of temperature profile/distribution. As the non-uniform temperature within the driveline structure changes the misalignment, the power loss at the gear mesh changes, modifying the steady state temperature distribution. examples described herein can include a step of iterating on these values until convergence is achieved.

Such iterative steps (including the iterative loop that is indicated in FIG. 8b) can have a specific benefit in the calculation of vehicle energy/fuel consumption, and thus emissions in conventional or hybrid vehicles powered by an internal combustion engine. The changing driveline temperature through the drive cycle can change the viscosity of the oil, which can change many of the key components of driveline efficiency, including gear mesh power loss and gear churning. It is known that the efficiency of passenger car drivelines is relatively poor at start up and improves as the driveline warms up. The engineering effect of examples described herein is that the changing temperature and efficiency of the driveline can be predicted in a way that cannot currently be achieved, leading to lower risk in the design and development process and eventually more efficient vehicles.

For examples described herein that include an iterative step: the initial component power loss values can only include the value of misalignment calculated without the influence of temperature profile/distribution; but as the non-uniform temperature within the driveline structure changes the misalignment, the component power loss values can change, modifying the steady state temperature distribution. Iteration can continue (around the loop identified in FIG. 8b) until a convergent solution for one or more of system deflections, component power losses, and temperatures is obtained for steady-state or transient conditions.

Figure 9:
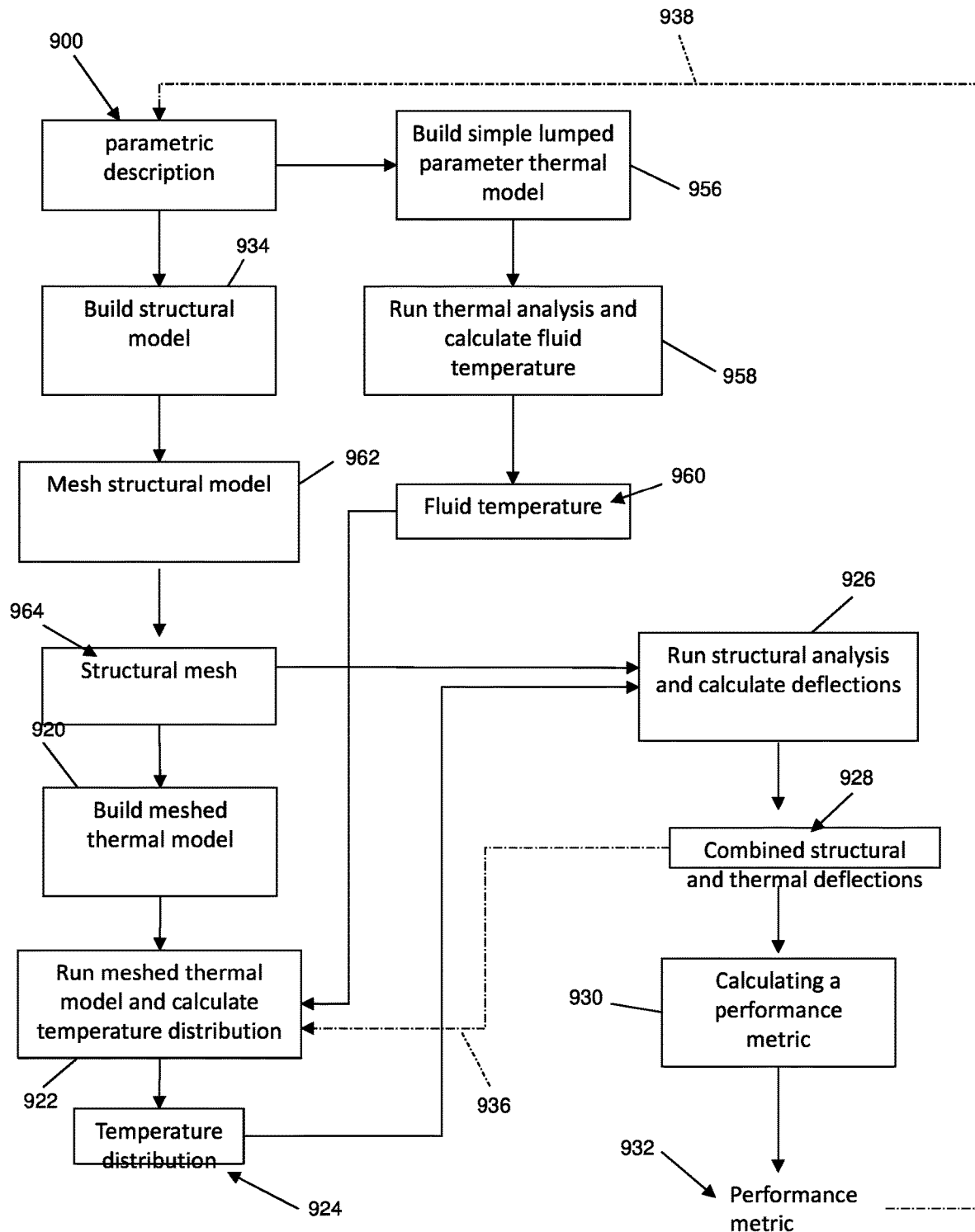
FIG. 9 shows a further example of a schematic view of a computer-implemented method for modelling or designing a driveline where the thermal model comprises a simple lumped parameter thermal model and a meshed model.

FIG. 9 shows a further still example of a schematic view of a computer-implemented method for modelling or designing a driveline. Features of FIG. 9 that have corresponding features in an earlier figure will be given reference numbers in the 900 series and will not necessarily be described again here.

FIG. 9 shows a method of thermal modelling, which is a combination of a simple lumped parameter thermal network model (built at step 956) and a detailed meshed thermal model (built at step 920). It is not obvious to combine simple and detailed thermal models because it is perceived that a simple lumped parameter thermal network model will not give sufficient accuracy to assist in a detailed analysis. A disadvantage of undertaking a thermal analysis using only a detailed meshed model is that simulations require computational power, and take a long time to run. The combination of simple and detailed thermal models, however, has faster simulation times while retaining the required accuracy of results.

As will be discussed in more detail below, the method of FIG. 9 builds a simple lumped parameter thermal network model at step 956 that is used to calculate fluid temperature 960. Fluids can include coolant, lubricant, air inside the driveline, and air outside the driveline. Fluid temperatures 960 are the output of the simple lumped parameter thermal network model, and are used to calculate convection HTCs, which in turn are used as an input to the meshed thermal model. Advantageously, the method can also use fluid temperatures to calculate required pump flow rates for the driveline.

At step 956, the method builds a simple lumped parameter thermal model based on the parametric description 900. This thermal model can be considered as a lumped-parameter-thermal-model (which may also be referred to as a first thermal model). Then at step, 958, the method runs thermal analysis on the simple lumped parameter thermal model in order to calculate one or more fluid temperatures 960, such as those identified above.

At step 934, the method builds a structural model of the driveline based on the parametric description 900. Then at step 962, the method meshes the structural model that was built at step 934 in order to determine a structural mesh 964.

At step 920, the method builds a meshed thermal model based on the structural mesh 964. This thermal model can be considered as a meshed-thermal-model (which may also be referred to as a second thermal model). The meshed-thermal-model can have a higher resolution (for example, it can be discretised more finely) than the lumped-parameter-thermal-model that was built at step 956, and optionally with the same mesh as the structural model.

At step 922, the method calculates a temperature distribution 924 based on: (i) the structural mesh model 964; and (ii) the fluid temperatures 960.

For instance, step 922 can use the fluid temperatures 960 to calculate convection HTCs. Calculating HTCs can be complicated and depends on multiple factors, including flow rates and surface roughness. Values of HTCs can be estimated based on the definition of the Nusselt number (Nu), a dimensionless number representing the ratio of convective to conductive heat transfer across (normal to) a boundary. For example, for natural convection over a plate, the Nusselt number equation is:

$$Nu = hL/k = CRa^n \qquad \text{(Equation 5)}$$

where h is the HTC, L is the characteristic length, k is the thermal conductivity, Ra is the Rayleigh number, and C and n are constants that depend on the geometry and the flow.

The parameters L (a geometry parameter) and k (a material property) can be defined in the parametric description 900 of the driveline, and therefore step 922 can also perform its processing based (directly or indirectly) on the parametric description 900. The Rayleigh number Ra is a dimensionless number that describes the heat transfer behaviour: when the Rayleigh number is below a critical value for a given fluid, heat transfer is primarily in the form of conduction; when it exceeds the critical value, heat transfer is primarily in the form of convection. The Rayleigh number depends on fluid properties and fluid temperature. There are standard textbook results that define the values of C and n for given geometries and conditions, e.g. isothermic vertical plate, isothermic horizontal plate. Therefore, when geometry and fluid properties and fluid temperature are known, the method can calculate the value of the convection heat transfer coefficient.

The method of calculating h is similar for different geometries and operating conditions. The right hand side of Equation 5 can be different depending on the geometry and operating conditions, but still involves constants and fluid properties.

Although calculating HTCs using the Nusselt number is known, advantageously the method of FIG. 9 does this using fluid temperatures calculated in a simple model (at step 956), and then applies the resulting HTCs to a detailed model (at step 922). The above method of calculating HTCs for convection has advantages compared to the standard method of using a CFD model. The method described above has the advantage of fast simulation time and not requiring large amounts of computational power.

Convection HTCs, thermal conductances, and heat flux from power sources are all inputs to the detailed meshed thermal model.

Step 920 can build the detailed meshed thermal model such that it uses the same mesh 964 as the structural model that is meshed at step 962. Each thermal node in the detailed meshed thermal model therefore has a corresponding structural node in the structural model 964 with exactly the same position. The output of step 922 is the temperature distribution 924, which can associate each thermal node in the thermal model with a temperature value.

At step 926, the method runs structural analysis in order to calculate deflections 928, based on: (i) the structural mesh 964; and (ii) the temperature distribution 924. Advantageously, the temperature distribution 924 calculated by the thermal model can conveniently and efficiently be used with the structural mesh 964 at step 926 because the meshes are the same. That is, the temperature for each structural node in the structural mesh 964 can be easily taken from the temperature distribution 924 that represents corresponding thermal nodes in the meshed thermal model. The performance metric 932 is calculated at step 930.

As an alternative to using a simple lumped parameter thermal network model to calculate fluid temperature 960, in some examples, the method may receive the fluid temperature 960 as a direct measurement—for instance as an input from a sensor. That is, steps 956 and 958 are not required in some examples. This may only be possible if the driveline design is sufficiently advanced that there is a prototype to test.

The first iterative loop that is described with reference to FIG. 6 can optionally be applied to this example, as represented schematically by loop 936. Additionally, or alternatively, the second iterative loop that is described with reference to FIG. 6 can be applied to this example, as represented schematically by loop 938.

Figure 10:
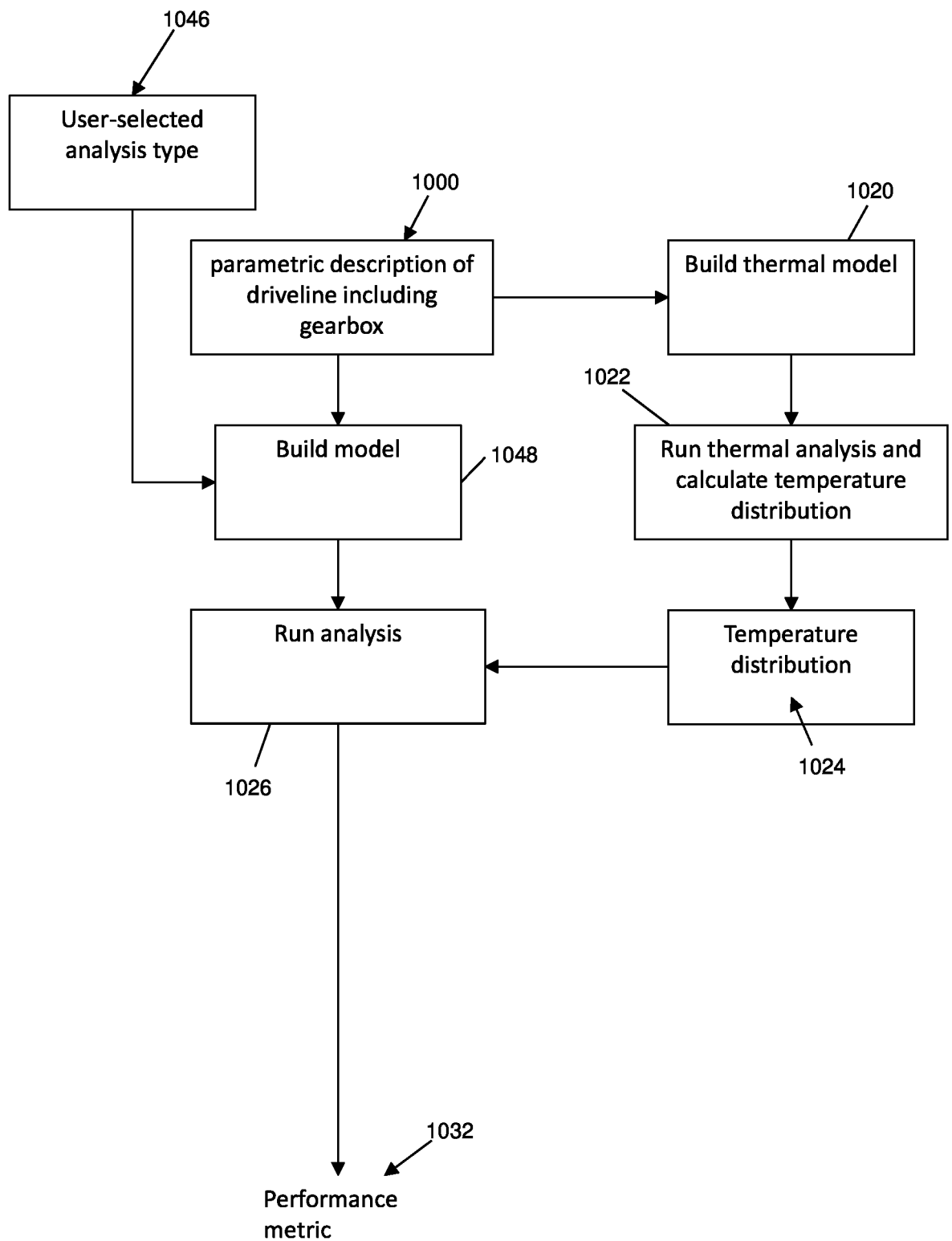
FIG. 10 shows a schematic view of another computer-implemented method for modelling a driveline in which the driveline includes a gearbox and the processing does not necessarily involve calculating a deflection.

FIG. 10 shows a schematic view of another computer-implemented method for modelling a driveline. Features of FIG. 10 that have corresponding features in an earlier figure will be given reference numbers in the 1000 series and will not necessarily be described again here.

In contrast to at least some of the methods described above, the processing of FIG. 10 does not necessarily calculate deflections. In this example, the parametric description 1000 relates to a driveline that comprises a plurality of components including a gearbox. As will be appreciated from the above description of a parametric description and drivelines, the parametric description 1000 can relate to a driveline that also includes other components including an electric machine.

The method of FIG. 10 processes: (i) the parametric description 1000, and (ii) an indication 1046 of one or more types of analysis to be performed for the driveline. In the same way as described above, the method can receive the indication 1046 of one or more types of analysis to be performed for the driveline from a user, or can retrieve it from computer memory. Similarly, the method can receive the parametric description 1000 from a user or can retrieve it from computer memory.

In this example the type of analysis that is to be performed does not necessarily require the calculation of deflections for nodes in the structural model of the driveline caused by thermal effects. Advantageously, the type of analysis that is to be performed is one that can be performed more accurately by taking into account a temperature distribution 1024 of the driveline, as will be appreciated from the following discussion.

At step 1048, the method can build a model of the driveline for the type of analysis that has been specified. In the same way as described above with reference to FIG. 7, the method can automatically select data from the parametric description 1000 that is required for the specified type of analysis, and then build a mathematical model using that selected data. The model can be any type that is suitable for the type of analysis that is to be performed.

Independently, at step 1020, the method creates a thermal model of at least the gearbox of the driveline from the parametric description 1000. Then, at step 1022, the method runs thermal analysis and calculates a temperature distribution 1024 for at least the gearbox using the thermal model. These steps can be performed according to any of the examples described herein.

At step 1026, the method runs an analysis to calculate a performance metric 1032 of the driveline according to the type of analysis 1046 to be performed, based on the calculated temperature distribution 1024 and the parametric description 1000. In this example, the analysis at step 1026 can be considered as indirectly processing the parametric description 1000; that is, it processes the model that was built at step 1048, wherein the model is built based on the parametric description 1000.

Advantageously, the method of FIG. 10 can enable thermal processing to be combined with another type of analysis, including another type of analysis that relates to a different type of physics, as defined by the received indication 1046 of one or more types of analysis to be performed. Processing of such a combination of types of analysis can be particularly difficult for drivelines that include both gearboxes and electric machines. It is usual for gearbox designers and electric machine designers to belong to different departments or even different companies, and because of this there is a prejudice in the art that would prevent the skilled persons from these two disciplines from even considering such a combination of analysis types on a driveline containing both motor and gearbox. Even if the skilled persons were to work together across different disciplines, there is a lack of CAE tools that can carry out simulation for the complete drivetrain in multiple physical domains in reasonable simulation times while considering all relevant influences and interactions. The problems that are described above in relation to combining different types of models can be addressed by the method of FIG. 10.

Figure 11:
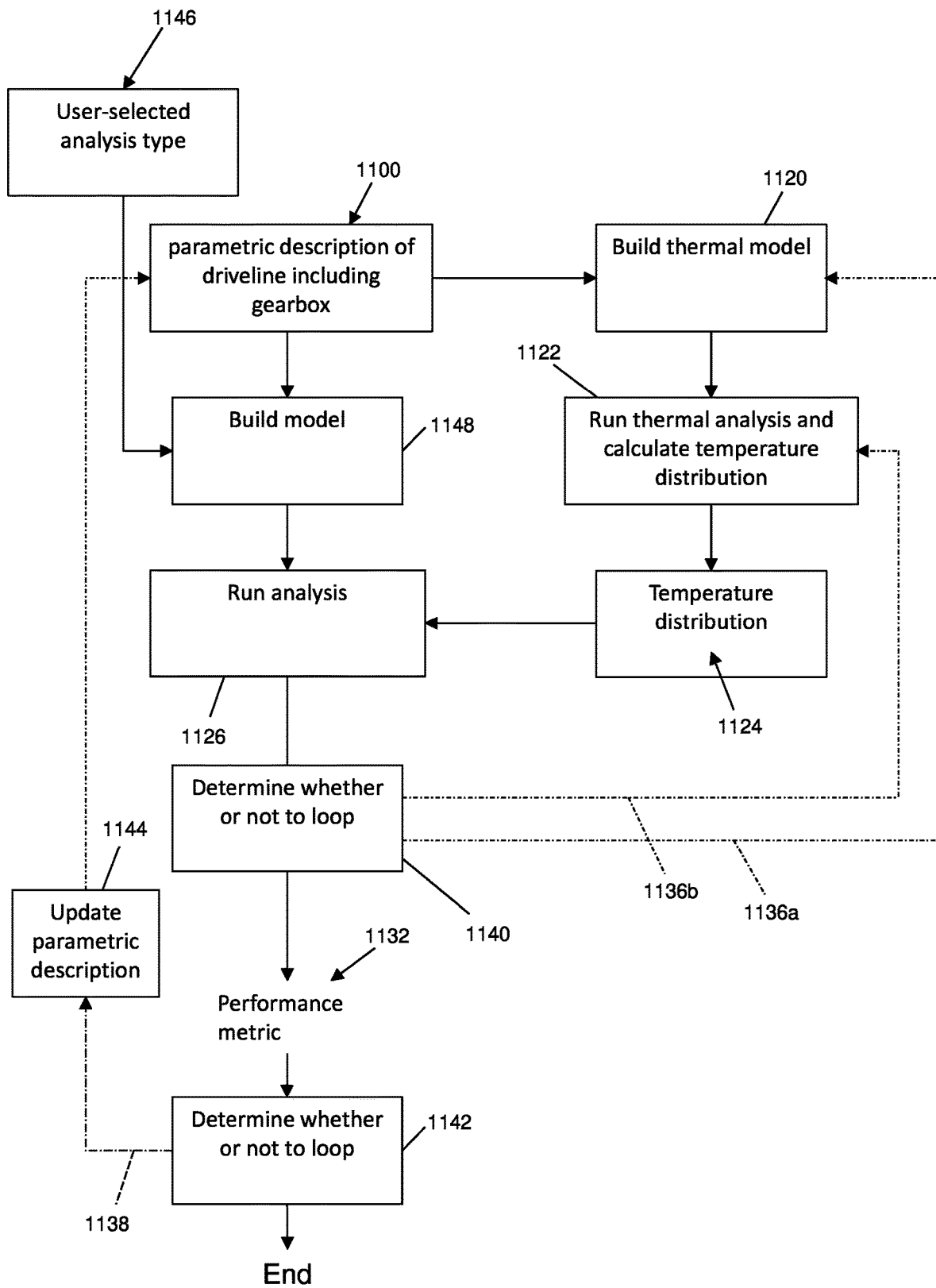
FIG. 11 shows a schematic view of another computer-implemented method for modelling a driveline, and optionally for designing a driveline, that is similar to FIG. 10 and includes iterative loops.

FIG. 11 shows a schematic view of another computer-implemented method for modelling a driveline, and optionally for designing a driveline. FIG. 11 is similar to FIG. 10, and includes the additional functionality of three optional iterative loops 1136*a*, 1136*b*, 1138. These loops can be provided independently of each other or together.

The first iterative loop 1136*a* involves processing (at step 1140) an output of the run analysis block 1126, after step 1126 has been performed for the first time (for the initial calculation of the performance metric 1132).

The processing at step 1140 can compare a loop-performance-metric associated with the driveline (which may the same as, or different to, the performance metric 1132 that is provided as an output) with one or more loop-end-conditions, in a similar way to that described above in relation to other iterative loops. If the one or more loop-end-conditions are not satisfied, then the method returns to step 1120 to rebuild the thermal model based on the loop-performance-metric and the parametric description 1100. If the one or more loop-end-conditions are satisfied, then the method can move on to step 1142 to determine whether or not to loop around the third iterative loop 1138.

The loop-performance-metric that is processed at step 1140, to determine whether or not to iterate around the first loop, can be the performance metric 1132 that is associated with the selected type of analysis (in line with the received indication 1146) or can be any other performance metric such as an intermediate-performance-metric. For instance, if the type of analysis that is to be performed is efficiency analysis, the performance metric 1132 that is provided as an output of the method can be an efficiency metric. However, a different performance metric may be processed at step 1140 as the loop-performance-metric to determine whether or not to loop. For instance, the loop-performance-metric may comprise an intermediate-performance-metric, such as power loss that may be determined as part of the efficiency calculations. Similar functionality is described above with reference to FIGS. 8a and 8b.

For each subsequent iteration, the method can then repeat steps 1122, 1126 and 1140 for the rebuilt thermal model.

The second iterative loop 1136b is similar to the first iterative loop 1136a, and can involve the same processing at step 1140 that is described above for the first iterative loop 1136a.

In contrast to the first iterative loop 1136a, if one or more loop-end-conditions are not satisfied for the second iterative loop 1136b, then the method returns to step 1122 to recalculate the temperature distribution 1124 based on the loop-performance-metric and the thermal model. If the one or more loop-end-conditions are satisfied, then the method can move on to step 1142 to determine whether or not loop around the third iterative loop 1138. For each subsequent iteration, the method can repeat steps 1126 and 1140 for the recalculated temperature distribution 1124.

In relation to the third iterative loop 1138, the method can optionally comprise the step 1144 of updating the parametric description 1100 based on the performance metric 1132 (or more generally any loop-performance-metric that is described above with reference to the first and second iterative loops) of the driveline. After the parametric description 1100 has been updated, the method can repeat steps 1148, 1120, 1122, 1126, 1140 and 1142 for the updated parametric description 1100.

In this example, the method includes the functionality of determining whether or not to go around the third iterative loop 1138. This functionality is shown in FIG. 11 as step 1142. At step 1142, the method can compare the performance metric 1132 (or another loop-performance-metric) with one or more loop-end-conditions. If the one or more loop-end-conditions are not satisfied, then the method moves on to step 1144 to update the parametric description 1100 and then repeats the method of FIG. 11. If the one or more loop-end-conditions are satisfied, then the method ends.

The process of going around the third iterative loop 1138, which updates the parametric description 1100, can be considered as designing a driveline.

It will be appreciated that any of the other functionalities that are described with reference to an earlier figure can be combined with the methods of FIGS. 10 and 11.

Generally, in the methods that are illustrated in the accompanying drawings, text that is in an enclosed box represents a processing step, and words that are not in enclosed boxes are illustrative of data (such as inputs or results). Also, various dotted arrows and lines can be considered as optional.

An effect of examples described herein is that engineering productivity can be substantially improved, and it can be possible for this modelling/design work to be carried out by an engineer who is not a specialist in thermal modelling and simulation. Any design changes within the driveline can automatically result in a change in the thermal simulation results, leading to confidence that the correct results are presented on each occasion.

In examples where the structural model is solved by dynamic analysis, a further development can improve the dynamic analysis of a driveline system and subsequent prediction of vibration and radiated noise. Examples described herein can include a parametrically defined model of the driveshaft including constant velocity joints, whose stiffness varies with both applied load (torque) and angle of articulation. In carrying out this calculation and including it in the overall system dynamic model, a more accurate prediction of the dynamic behaviour of the driveline is achieved.

Examples described herein can be used to predict gear scuffing by calculating the tooth contact analysis and using a local tribology model to predict the temperature rise due to the gear mesh. This prediction can be affected by the calculated thermal behaviour in two ways—firstly, the varied value of misalignment can change the tooth contact analysis and thus the predicted temperature rise in the mesh; secondly, the thermal analysis can be used to indicate the temperature of the oil within the driveline as a whole, prior to it going into the mesh.

Examples described herein can perform processing that relates to steady state or transient conditions. The results from steady state conditions can be easier to interrogate and verify, although they can be less representative of real life operation.

Transient analysis implies that the conditions are not constant, but the same interaction between power losses, thermal simulation and system deflection can be relevant. The transience can arise principally from changing operating conditions, such as driving speed or torque. This can be used to represent real life operating conditions. The automotive industry use quasi-standard worst cases such as "Death Valley Cycle", where the driving conditions in Death Valley, in terms of speed, torque and external heat, are defined and used as inputs to a time-stepping simulation.

One or more of the previous simulations can be run with the component dimensions at nominal values. In addition, it can be possible to assign manufacturing tolerances to key parameters so that the variation in performance of the driveline can be assessed. For example, a variation in gear micro-geometry as a result of variation in the gear manufacturing process can affect the loaded tooth contact analysis and hence the interaction with the changing misalignment arising from thermal distortions. In some examples, safety can be improved by ensuring that the component durability is still acceptable when taking into account manufacturing tolerances and variation due to temperature changes.

One Example for Carrying Out the Invention

This invention is a Software Package allowing engineers to understand the design of any or all of the 3 sub-systems of gearbox, motor and power electronics within a mechanical or electro-mechanical driveline through simulation in order that the driveline performance can be predicted, understood and improved through design modifications. The invention focusses on the subject of thermal performance and how it interacts with other aspects of physical behaviour such as deflections, stress, fatigue, efficiency, noise, vibration, wear etc.

The invention focusses on the subject of thermal performance and how it interacts with other aspects of physical behaviour such as deflections, stress, fatigue, efficiency, noise, vibration, wear etc. Its functionality provides to the design engineer insight on thermal behaviour and how it affects the other aspects of driveline performance so that designs can be optimised and confirmed as fit for purpose with a productivity not previously possible. Time and money is saved in the bringing of new products to market and also the problem resolution in existing products. Most importantly, there is the potential to further safeguard human life.

Detailed Description of a Mode for Carrying Out the Invention

Principally, all the key engineering parameters of the gearbox are defined in a single model, including form, function, load cases and material properties. These are defined in a parametric model that allows rapid redefinition of the design, allowing rapid design-analyse-redesign iterations according to the results of a multiplicity of physical simulations.

A key feature of the invention is that there is a single Parametric Description of the system, from which multiple models for multiple failure mode analyses are derived.

The term Parametric Description is the label applied to the collection of data that defines the product in terms of its form, function, properties and operating conditions. Form includes data relating to geometry; Properties include the material properties of the components, plus component specific properties such as the dynamic capacity of a bearing, the surface roughness of a gear tooth flank, the viscosity of a lubricant, the Goodman diagram of a shaft material, the resistivity of electric motor windings etc.; Operating conditions includes principally the power, speed, torque of the rotating machinery, either as a time history or a residency histogram, but also includes temperature, humidity etc.; Function defines the way in which the product, sub-systems and components perform their primary function, for example, the function of a roller bearing is to provide support to a shaft whilst allowing it to rotate, assemble a shaft and a bearing together and the combined function is to provide a rotating shaft to which loads can be applied, mount a gear on the shaft, mesh it with a similarly mounted gear and the combined function is to change speed and torque (i.e. a gearbox).

(e.g. AVL Cruise) are similar to those in Multi-domain dynamic simulation packages, in that they have aspects of function, properties and operating conditions that are pertinent to the specific failure mode that is being simulated (see FIG. 1), but no form.

This is illustrated in FIG. 3, where the relevant data set for analysis 310 is represented by the triangular set overlapping part Form set 304, Properties set 306 and Operating Conditions set 306 and which, in this example, provides data for multi-body dynamics or finite element packages. Similarly, the relevant data set for analysis 312 is represented by the triangular set overlapping part of Function set 302, Properties set 306 and Operating Conditions set 308 and which, in this example, provides data for multi-domain dynamic simulation or application-specific vehicle performance packages. Likewise, the relevant data for analysis 314 is represented by the triangular set overlapping part of Form set 304 and Properties set 306 and which provides data for CAD.

In traditional software packages, the absence of all four types of data leads to discontinuities in the work flow within the design process. FIG. 3 illustrates how it is this discontinuity that this invention eliminates.

A multiplicity of simulations are run to determine the performance of the driveline or the likelihood of the different failure modes. Each of these simulation results arise from mathematical models of the operating performance of the driveline, with each physical phenomenon requiring a different algorithm, and all algorithms being available within the single package so as to maximise engineering productivity.

TABLE 1

Analysis-Specific Data Selection and the Parametric Description

| Analytical Package | 300 Parametric Description | | | |
| --- | --- | --- | --- | --- |
| | 302 FUNCTION | 304 FORM | 306 PROPERTIES | 308 OPERATING CONDITIONS |
| 310 Multi-body Dynamics & Finite Element Packages | | Yes | Yes | Yes |
| 312 Multi-domain Dynamic Simulation; Application-specific vehicle performance packages | Yes | | Yes | Yes |
| 314 CAD | | Yes | Yes | |

The first row of Table 1 shows a representation of parametric description 300, formed of four data sets (Function 302, Form 304, Properties 306, and Operating Conditions 308). FIG. 3 shows a further representation of parametric description 300, formed of four non-overlapping data sets (Function 302, Form 304, Properties 306, and Operating Conditions 308). Depending on which analytical package 310, 312, 314 is used, the engineer has to select data from one or more of the four data sets to create an analytical model suitable for the analysis being performed.

In traditional software packages, CAD provides form (geometry) and some aspects of properties (material density but not Young's Modulus), but it does not include operating conditions or function. Models in Multi-Body Dynamics and Finite Element packages include certain aspects of form, function, properties and operating conditions, but only those that are pertinent to the specific failure mode that is being simulated (see FIG. 1). Models in Multi-domain dynamic simulation also use the aspects of function, properties and operating conditions that are pertinent to the specific failure mode that is being simulated (see FIG. 1), but no form. Models in application specific vehicle simulation packages Alongside the models and corresponding simulations for stress, fatigue, scuffing, TE, planetary load-sharing and efficiency, the invention creates a discretised, lumped parameter thermal network model of the gearbox, consisting of thermal inertias linked together by thermal conductances. These inertias and conductances take their connections and properties from the parametric description of in the form of shafts, bearings, gears, housing and, where appropriate, other components including clutches, brakes and synchronisers. The model also includes values for heat transfer coefficients for the gears to the oil, shafts to the oil, oil to the housing and housing to the environment, which are inserted based on default values, although the user is able to modify these at his/her own discretion.

Heat transfer through the bearing is assigned default values. However, there is an option for these values to be calculated based on the static analysis of the roller bearing and the contact area generated by the load dependent stiffness.

Heat flux into the thermal model occurs at the gears and bearings and the invention automatically recognises that heat will be generated at these locations in the model. The values of these heat fluxes can be defined by the user or automatically set by the calculation of gear mesh power loss and bearing drag, bearing drag and power loss indicating a loss of rotational power which therefore corresponds to the generation of heat. A multiplicity of gear mesh power loss methods are available, including ISO 14179, Anderson, FVA 345 and elasto-hydrodynamic lubrication. These, in turn, and influences by the loaded tooth contact of the gear mesh which has as a key input parameter the operating mesh misalignment.

There is the option to select from a range of bearing loss models, including but not limited to ISO 14179, Palmgren and SKF 2004.

Thus the user is freed from the time consuming job of creating the lumped parameter thermal model manually and the model is created in a process that is repeatable and error free. Further time savings and error avoidance is achieved by the automatic set up of the thermal inputs at the gears and the bearings, and the definition of the heat flux values based on the operating conditions of the components.

The effect is that engineering productivity is substantially improved, and it is possible for this work to be carried out by an engineer who is not a specialist in thermal modelling and simulation. Any design changes within the gearbox automatically result in a change in the thermal simulation results, leading to confidence that the correct results are presented on each occasion.

Thermal analyses can be run using the lumped parameter models, leading to values of the temperature being obtained at discrete thermal nodes. In order for the thermal profile throughout the full structure to be calculated, a further thermal calculation is carried out in the 3D structure, based on the thermal properties of the shafts, bearings, gears and housing. Thus, a smooth temperature profile is obtained throughout all the mechanical components in the gearbox.

The package includes a structural model of the gearbox, for the purposes of calculating loads, deflections, strains, misalignments and hence stresses. This is achieved by discretising the structure into a multitude of nodes and calculating their displacements in 6 degrees of freedom based on applied structural loads such as gear forces. An innovation of this invention is that these same nodes are also subject to an additional displacement due to thermal expansion, which is calculated based on the temperature profile from the thermal analysis. Changes occur in all values of deflections, strains and misalignments.

These changes have an impact upon the simulation of the performance of the key components in the gearbox. An altered value of misalignment changes the gear contact and bending stress and thus the predicted fatigue life of the gear is modified. An altered value of misalignment changes the loaded tooth contact analysis of each gear pair, leading to a change in the predicted gear mesh drag and transmission error.

Deflections within the gearbox structure are used to calculate the load-sharing between planets in a planetary gear set, which would ideally be equal but which in practice never is, owing to system deflections and manufacturing errors. Again, an altered value of displacement in the structural model leads to a modified calculation of the planetary load-sharing.

Bearing fatigue is determined from loads and deflections that arise from simulation of the complete system. An altered value of displacement and misalignment owing to the temperature profile modifies the bearing life.

Additionally, the system loads and displacements are used to calculate the gear mesh stiffness and bearing stiffness, both of which are load dependent and thus are also affected by the temperature profile. This is important since these values of stiffness are used in the creation of a dynamic model of the complete gearbox, which is subject to excitation by the transmission error in order to calculate surface vibration and/or radiated noise due to gear whine. All of these influences are dealt with seamlessly.

A further development improves the dynamic analysis of a driveline system and subsequent prediction of vibration and radiated noise. The invention includes a parametrically defined model of the driveshaft including constant velocity joints, whose stiffness varies with both applied load (torque) and angle of articulation. In carrying out this calculation and including it in the overall system dynamic model, a more accurate prediction of the dynamic behaviour of the driveline is achieved.

The prediction of gear scuffing involves calculating the tooth contact analysis and using a local tribology model to predict the temperature rise due to the gear mesh. This prediction is affects by the calculated thermal behaviour in two ways—firstly, the varied value of misalignment changes the tooth contact analysis and thus the predicted temperature rise in the mesh; secondly, the thermal analysis is used to indicate the temperature of the oil within the gearbox as a whole, prior to it going into the mesh.

In all of these analyses, the impact of including the effect of the temperature profile is to increase the accuracy of the prediction. Thus, the information provided to the design engineer is more accurate, allowing the design to be optimised with greater certainty and potential failures avoided. Gearboxes will be quieter and more efficient, and the risk of catastrophic and potentially life-threatening gearbox failure due to fatigue or scuffing is reduced.

All of this is achieved in a package that allows this work to be carried out by a non-expert, in a time scale that suits practical design projects and which facilitates multi-objective design optimisation.

There is the option to carry out this work at steady state or transient conditions. The results from steady state conditions are easier to interrogate and verify, although they are less representative of real life operation.

Even at steady state, the inclusion of thermal influences leads to an interesting circle of influence between the thermal, structural and power loss models. The initial gear mesh power loss value can only include the value of misalignment calculated without the influence of temperature profile. As the non-uniform temperature within the gearbox structure changes the misalignment, the power loss at the gear mesh changes, modifying the steady state temperature distribution. The software has a function to iterate on these values until convergence is achieved.

Transient analysis implies that the conditions are not constant, but the same interaction between power losses, thermal simulation and system deflection is relevant. The transience arises principally from changing operating conditions, such as driving speed or torque. This is used to represent real life operating conditions and the automotive industry use quasi-standard worst cases such as "Death Valley Cycle", where the driving conditions in Death Valley, in terms of speed, torque and external heat, are defined and used as inputs to a time-stepping simulation.

The automotive industry also uses standard drive cycles such as New European Drive Cycle to measure the fuel economy and emissions off a vehicle. In the invention, each drive cycle commences with a given external temperature and ambient thermal distribution within the driveline (likely to be but not necessarily uniform). This uniform distribution is used for the misalignment and hence power loss at t=0. As the cycle starts, heat inputs change the temperature distribution within the components leading to a change in misalignment and hence heat source. The evolution of temperature distribution is dependent on the initial conditions, the simulation inputs, and the interaction of gear mesh tribology, thermal dissipation and system deflections due to temperature distribution throughout the drive cycle.

This has a specific benefit in the calculation of vehicle fuel consumption, and thus emissions. The changing gearbox temperature through the drive cycle changes the viscosity of the oil which changes many of the key components of gearbox efficiency, including gear mesh power loss and gear churning. It is known that the efficiency of passenger car powertrains is relatively poor at start up and improves as the powertrain warms up. The engineering effect is that the changing temperature and efficiency of the driveline can be predicted in a way that cannot currently be achieved, leading to lower risk in the design and development process and eventually more efficiency vehicles.

All of the previous simulations can be run with the component dimensions at nominal values. In addition, it is possible to assign tolerances to key parameters so that the variation in performance of the driveline can be assessed. For example, a variation in gear micro-geometry as a result of variation in the gear manufacturing process will affect the loaded tooth contact analysis and hence the interaction with the changing misalignment arising from the thermal distortions. Potentially, safety will be improved.

Numbered Clauses

There is also provided the subject matter as defined by the following numbered clauses:

1. A computer-implemented method for designing a driveline comprising the steps of:
   providing a parametric definition of the driveline;
   a user specifying a type of analysis to be performed on the input data;
   determining which features of the input data be used for the analysis according to the type of analysis selected; and
   creating a lumped parameter thermal model from the parametric definition;
   analysing a performance of said driveline according to said type of analysis to be performed;
   whereby a design for making a driveline is produced.
2. A method according to Clause 1, in which thermal inputs to the thermal model include calculation of the power losses at the gear mesh and/or the bearings.
3. A method according to Clause 2, in which the heat transfer coefficient at the bearings can either be defined manually or calculated according to the operating conditions of the bearing
4. A method according to Clauses 2 or 3, in which a prediction of non-uniform thermal distribution in the gearbox is carried out due to steady-state or transient operating conditions
5. A method according to Clause 4, in which the non-uniform thermal profile of the gearbox components is used to calculate the operating misalignment of the gears and bearings, with or without deflections due to gear forces
6. A method according to Clause 5, in which the operating misalignment is used as an input to the calculation of any of gear stress, gear fatigue, gear scuffing, gear transmission error, gear mesh power loss, gear mesh stiffness, planetary gear load-sharing, bearing non-linear stiffness, bearing fatigue, gearbox efficiency, gearbox mode shapes, dynamic forced response due to gear transmission error
7. A method according to Clause 6, in which a predicted oil temperature within the system is used as an input to the calculation of gear scuffing
8. A method according to Clause 6, in which the power losses at the gear mesh and/or the bearings, system thermal simulation and system deflection all interact with one another to lead to a convergent solution at steady-state or transient condition
9. A method according to Clause 8, in which the convergent solution on power losses at the gear mesh and/or the bearings is used to calculate gearbox efficiency in steady-state or transient condition
10. A method according to Clause 1, in which the load and angle-dependent stiffness of a constant velocity joint is calculated a combined in the system mode shape analysis with load dependent stiffness of rolling element bearings
11. A method according to any previous clause in which parametric definition of the driveline is subject to manufacturing tolerances.
12. A computer readable product for computer aided engineering design of a driveline, the product comprising code means for implementing the steps of the method according to any of Clauses 1 to 11.
13. A computer system for computer-aided engineering design of a rotating machine assembly, the system comprising means designed for implementing the steps of the method according to any of Clauses 1 to 11.

The invention claimed is:

1. A computer-implemented method for modelling a driveline, the driveline comprising a plurality of components, the method comprising the steps of:
   a) receiving a parametric description of the driveline;
   b) creating a thermal model of the driveline from the parametric description;
   c) calculating a temperature distribution for one or more components of the driveline using the thermal model;
   d) determining a deflection of one or more components of the driveline caused by the temperature distribution, based on the parametric description and the temperature distribution;
   e) calculating a performance metric of the driveline based on the determined deflection of the one or more components;
   f) comparing the performance metric with one or more loop-end-conditions:
      updating the parametric description based on the performance metric of the driveline; and
   repeating steps b) to e) for the updated parametric description until the one or more loop-end-conditions are satisfied.

2. The method of claim 1, further comprising:
   creating a structural model of the driveline from the parametric description; and
   determining the deflection of one or more components of the driveline caused by the thermal distribution, based on the structural model and the temperature distribution.

3. The method of claim 1, further comprising:
   recalculating the temperature distribution for the one or more components of the driveline based on the thermal model and also the determined deflection; and
   repeating steps d) and e) for the recalculated temperature distribution.

4. The method of claim 1, wherein calculating a performance metric includes:
   applying a drive cycle to the driveline for a plurality of different environmental conditions.

5. The method according to claim 1, further comprising:
automatically determining which features of the parametric description to use for calculating the performance metric, based on a type of analysis to be performed.

6. A method according to claim 1, wherein creating the thermal model of the driveline comprises:
calculating power losses at one or more of the components of the driveline; and
converting the calculated power losses into one or more thermal inputs of the thermal model.

7. A method according to claim 1, further comprising:
calculating a value of operating misalignment based on the determined deflection; and
calculating one or more of the following based on value of operating misalignment: power losses for the driveline, gear stress, gear fatigue, gear scuffing, gear transmission error, gear mesh power loss, gear mesh stiffness, planetary gear load-sharing, bearing nonlinear stiffness, bearing fatigue, driveline efficiency, driveline mode shapes, dynamic forced response due to excitations such as gear transmission error, torque ripple, stator radial forces.

8. A method according to claim 7, further comprising:
using a predicted lubricant temperature within the driveline as an input to the calculation of gear scuffing.

9. A computer readable product for computer aided engineering design of a driveline, the product comprising code means for implementing the steps of the method according to claim 1.

10. A computer-implemented method for modelling a driveline, the driveline comprising a plurality of components, the method comprising the steps of:
a) receiving a parametric description of the driveline;
b) creating a thermal model of the driveline from the parametric description;
c) calculating a temperature distribution for one or more components of the driveline using the thermal model;
d) determining a deflection of one or more components of the driveline caused by the thermal distribution, based on the parametric description and the temperature distribution;
e) receiving an indication of a type of analysis to be performed for the driveline;
g) calculating a performance metric of the driveline based on the determined deflection of the one or more components according to the type of analysis to be performed, wherein the type of analysis to be performed is an efficiency analysis, and the performance metric is an efficiency metric;
h) calculating the efficiency metric of the driveline based on: the parametric description, the determined deflection of the one or more components, and the calculated temperature distribution;
i) comparing a power loss profile with one or more loop-end-conditions; and
if the one or more loop-end-conditions are not satisfied, then:
recreating the thermal model of the driveline based on the power loss profile; and
repeating the calculation of the power loss profile based on the recreated thermal model;
if the one or more loop-end-conditions are satisfied, then:
calculating the efficiency metric of the driveline based on: the parametric description, the determined deflection of the one or more components, and the calculated temperature distribution.

11. A computer-implemented method for modelling a driveline, the driveline comprising a plurality of components, the method comprising the steps of:
a) receiving a parametric description of the driveline;
b) creating a thermal model of the driveline from the parametric description;
c) calculating a temperature distribution for one or more components of the driveline using the thermal model;
d) determining a deflection of one or more components of the driveline caused by the thermal distribution, based on the parametric description and the temperature distribution;
e) building a structural meshed model based on the parametric description;
f) building a meshed-thermal-model based on the structural meshed model;
g) calculating a temperature distribution for one or more components of the driveline using: the meshed-thermal-model; and one or more fluid temperatures associated with the driveline;
h) determining the deflection of one or more components of the driveline caused by the thermal distribution, based on: the structural meshed model; and the temperature distribution; and
i) calculating the performance metric of the driveline based on the determined deflection of the one or more components.

12. The method of claim 11, further comprising:
creating a lumped-parameter-thermal-model of the driveline from the parametric description; and
calculating the fluid temperature associated with the driveline based on the lumped-parameter-thermal-model.

13. The method of claim 11, further comprising:
receiving the fluid temperature associated with the driveline as an input from a sensor.

14. A computer-implemented method for modelling a driveline, the driveline comprising a plurality of components, the method comprising the steps of:
a) receiving a parametric description of the driveline;
b) creating a thermal model of the driveline from the parametric description;
c) calculating a temperature distribution for one or more components of the driveline using the thermal model;
d) determining a deflection of one or more components of the driveline caused by the thermal distribution, based on the parametric description and the temperature distribution; and
e) calculating the performance metric of the driveline based on the determined deflection of the one or more components and by performing dynamic analysis of the driveline, including calculating a matrix of masses and stiffnesses of components in the driveline; and
f) calculating load and angle-dependent stiffness of a constant velocity joint and including this in the driveline dynamic analysis.

15. A method according to claim 14, further comprising:
calculating load-dependent stiffness of rolling element bearings and including this in the driveline dynamic analysis.

16. A computer-implemented method for modelling a driveline, the driveline comprising a plurality of components including a gearbox, the method comprising the steps of:
a) receiving a parametric description of the driveline;
b) receiving an indication of a type of analysis to be performed for the driveline;
c) creating a thermal model of at least the gearbox of the driveline from the parametric description;

d) calculating a temperature distribution for at least the gearbox of the driveline using the thermal model;
e) calculating a performance metric of the driveline according to the type of analysis to be performed, the calculated temperature distribution, and the parametric description;
f) recreating the thermal model based on a loop-performance-metric associated with the driveline; and
g) repeating steps d) and e) for the recalculated temperature distribution.

17. The method of claim 16, further comprising:
creating a structural model of the driveline based on the parametric description; and
calculating the performance metric of the driveline based on the structural model and the calculated temperature distribution.

18. A method according to claim 16, in which the driveline includes an electric machine.

19. A computer-implemented method for modelling a driveline, the driveline comprising a plurality of components including a gearbox, the method comprising the steps of:
a) receiving a parametric description of the driveline;
b) receiving an indication of a type of analysis to be performed for the driveline;
c) creating a thermal model of at least the gearbox of the driveline from the parametric description;
d) calculating a temperature distribution for at least the gearbox of the driveline using the thermal model;
e) calculating a performance metric of the driveline according to the type of analysis to be performed, the calculated temperature distribution, and the parametric description;
f) recalculating the temperature distribution based on a loop-performance-metric associated with the driveline; and
g) repeating step e) for the recalculated temperature distribution.

* * * * *